(12) United States Patent
Matsuno

(10) Patent No.: US 6,280,007 B2
(45) Date of Patent: Aug. 28, 2001

(54) BRAKING FORCE CONTROL SYSTEM FOR AUTOMOTIVE VEHICLE

(75) Inventor: Koji Matsuno, Gunma-Ken (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/769,316

(22) Filed: Jan. 26, 2001

Related U.S. Application Data

(62) Division of application No. 08/979,950, filed on Nov. 26, 1997, now Pat. No. 6,209,972.

(30) Foreign Application Priority Data

Nov. 29, 1996 (JP) .................................................. 8-319943

(51) Int. Cl.[7] ............................................................ B60T 8/60
(52) U.S. Cl. ........................................... 303/146; 303/140
(58) Field of Search ....................................... 303/139, 140, 303/145, 146, 447

(56) References Cited

U.S. PATENT DOCUMENTS 5,734,595 * 3/1998 Matsuno ............................... 303/145
5,782,543 * 7/1998 Monzaki et al. ..................... 303/140
5,826,951 * 10/1998 Sano ..................................... 303/146
5,863,105 * 1/1999 Sano ..................................... 303/146

* cited by examiner

Primary Examiner—Matthew C. Graham
(74) Attorney, Agent, or Firm—Smith, Gambrell & Russell, LLP

(57) ABSTRACT

A vehicle speed, an actual steering angle, an actual vehicle yaw rate, and a lateral vehicle acceleration are detected. On the basis of the detected vehicle speed, the detected actual vehicle yaw rate, and the detected lateral vehicle acceleration, the vehicle body slip angular velocity calculating section (32) calculates a vehicle body slip angular velocity. On the basis of the calculated vehicle body slip angular velocity, the front wheel steering wheel angle correcting section (33) corrects the actual steering angle. On the other hand, the braked wheel selecting section (36) selects a braked wheel. Further, the braking signal output section (37) outputs a braking signal to the brake driving section (16) so that the target braking force calculated by the target braking force calculating section (35) can be applied to the braked wheel selected by the braked wheel selecting section (36). Therefore, even if the driver unavoidably turns the steering wheel excessively on a slippery road, for instance, the target braking force is not set to a large value beyond necessity, with the result that a stable vehicle turning travel can be attained.

5 Claims, 11 Drawing Sheets

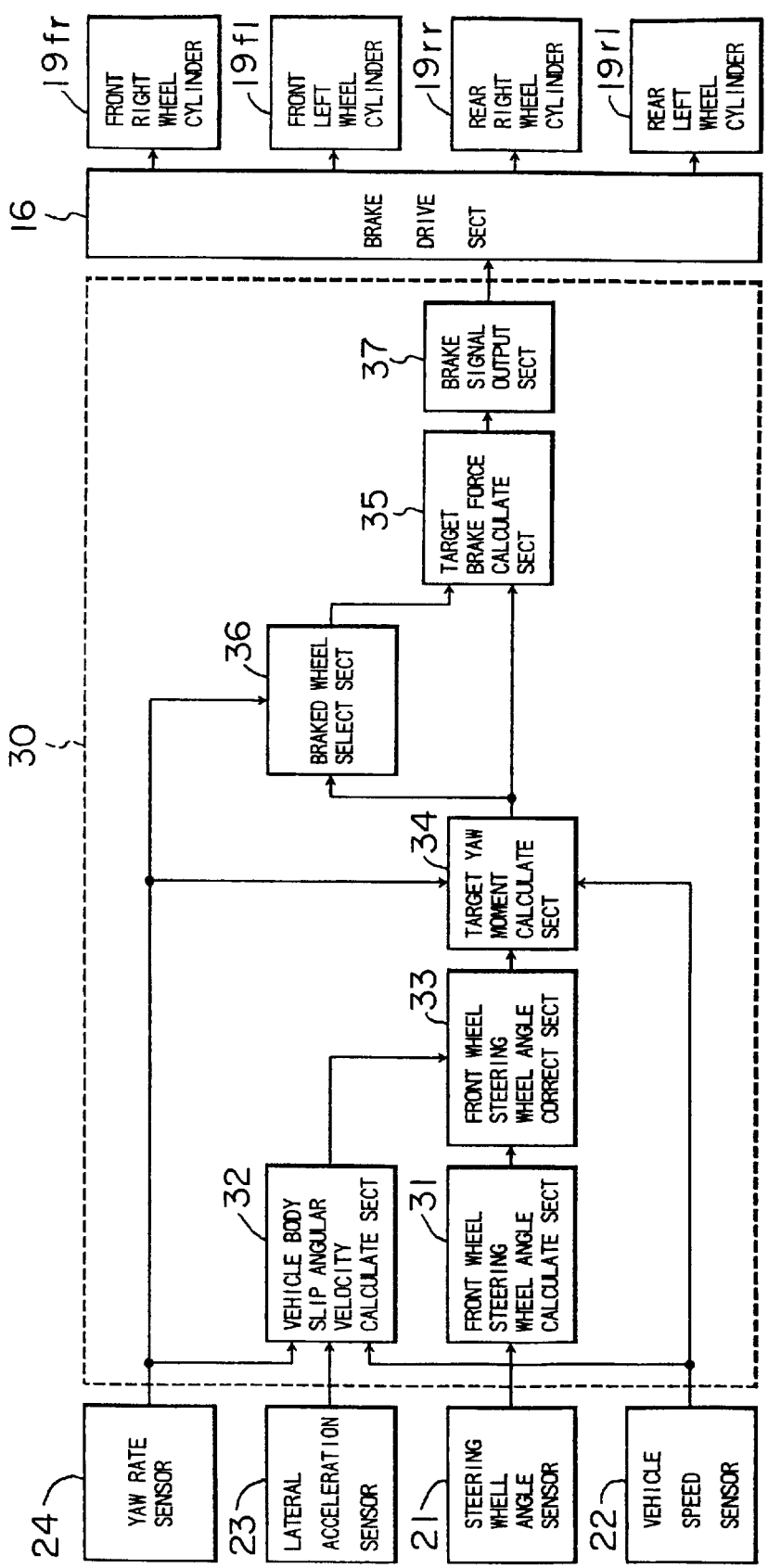
F I G. 1

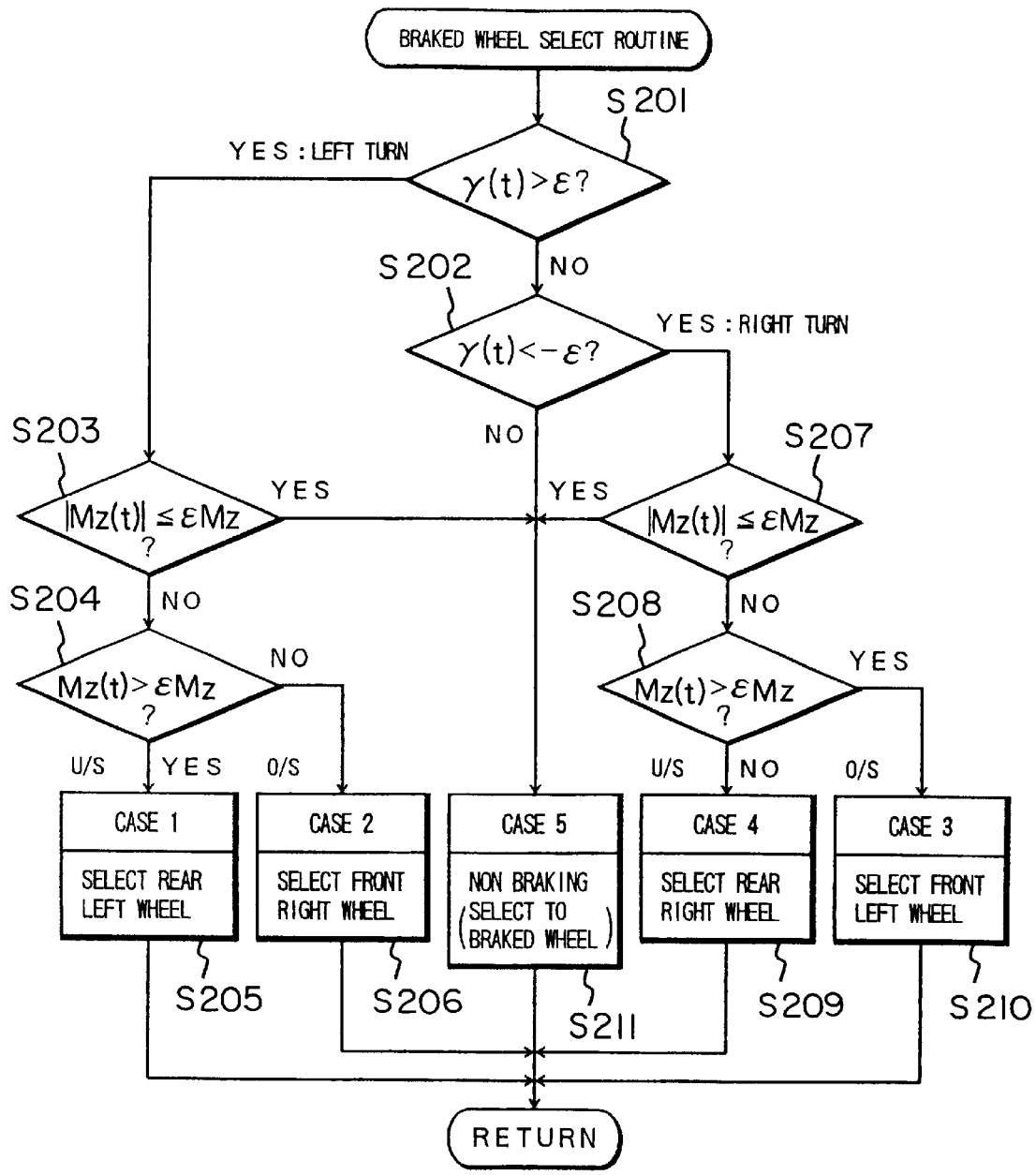
F I G. 5

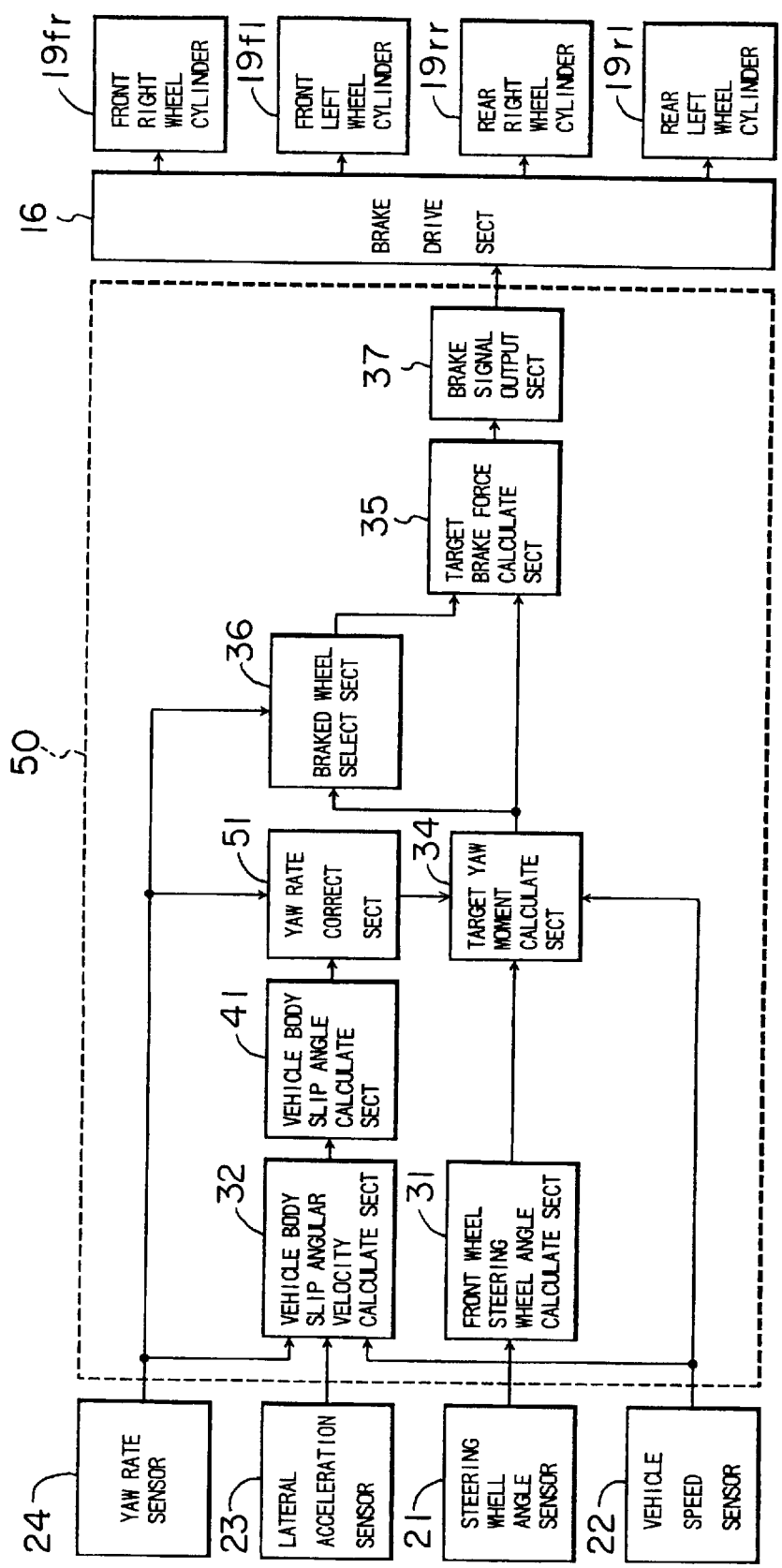
F I G. 10

BRAKING FORCE CONTROL SYSTEM FOR AUTOMOTIVE VEHICLE

This application is a division of U.S. application Ser. No. 08/979,950 filed Nov. 26, 1997 U.S. Pat. No. 6,209,972.

BACKGROUND OF THE INVENTION

1. Field of the Invention

The present invention relates to a braking force control system for an automotive vehicle, which can improve vehicle cornering stability by applying an appropriate braking force to a vehicle wheel during vehicle cornering.

2. Description of the Prior Art

In recent years, various braking force control systems for improving vehicle cornering stability have been developed and further put to practical use, by which an appropriate braking force can be applied to the vehicle wheel on the basis of some forces applied to the vehicle during cornering.

For instance, in the case of Japanese Published Unexamined Patent Application No. 5-24422, a technique for applying an appropriate braking force to a predetermined vehicle wheel is disclosed such that a target yaw rate is calculated on the basis of steering wheel angle and vehicle speed, and further a target braking force is calculated under due consideration of cornering power of a vehicle model (determined in accordance with various vehicle items and equations of motion) on the basis of detected loads applied to the vehicle wheels so that the actual yaw rate can become closer to the target yaw rate.

In the above-mentioned prior art technique, however, since the braking force is so controlled that the actual yaw rate may become closer to the target yaw rate obtained by calculation, in case the target yaw rate is set to an erroneous value, the braking force is determined erroneously, with the result that there exists a possibility that the vehicle can be lead into spin or drifts out. Therefore, for instance, when the driver turns the steering wheel excessively (e.g., to its full lock angle) to keep the vehicle away from an obstruction on a slippery road, there exists a problem in that such a large target yaw rate at which a stable vehicle driving cannot be attained is set In addition, when a braking force is applied to the vehicle wheel in such a way that the actual yaw rate become closer to the target yaw rate, there exists a possibility that the vehicle can be lead into spin or drift out.

SUMMARY OF THE INVENTION

With these problems in mind, therefore, it is a object of the present invention to provide a braking force control system for automotive vehicle, by which the vehicle can be driven stably during cornering, without setting an excessive target braking force, even when the driver unavoidably turns the steering wheel excessively on a slippery road, for instance.

To achieve the above-mentioned object, the first aspect of the present invention provides a braking force control system, comprising: vehicle speed detecting means for detecting a vehicle speed; steering wheel angle detecting means for detecting a steering angle; actual yaw rate detecting means for detecting an actual vehicle yaw rate; lateral acceleration detecting means for detecting a lateral vehicle acceleration; vehicle body slip angular velocity calculating means for causing a computer to calculate a vehicle slip angular velocity on the basis of the detected vehicle speed, the detected actual vehicle yaw rate, and the detected lateral vehicle acceleration; steering wheel angle correcting means for causing a computer to correct the detected steering wheel angle on the basis of the calculated vehicle slip angular velocity; target yaw moment calculating means for causing a computer to calculate a target yaw moment on the basis of the detected actual vehicle yaw rate, the detected vehicle speed, and the steering wheel angle corrected by said steering wheel angle correcting means; braked wheel selecting means for causing a computer to select a wheel to be braked on the basis of the detected actual vehicle yaw rate and the target yaw moment calculated by said target yaw moment calculating means; target braking force calculating means for causing a computer to calculate a target braking force to be applied to the wheel selected by said braked wheel selecting means on the basis of the target yaw moment calculated by said target yaw moment calculating means; and braking signal outputting means for causing a computer to output a signal to a brake drive section, for application of the target braking force calculated by said target braking force calculating means to the wheel selected by said braked wheel selecting means.

Here, it is preferable that when the vehicle body slip angular velocity calculated on the basis of the detected vehicle speed, the detected actual vehicle yaw rate, and the detected lateral vehicle acceleration lies within a predetermined set value, said steering wheel angle correcting means outputs the value detected by said steering wheel angle detecting means as it is to said target yaw moment calculating means as a corrected value.

Further, the second aspect of the present invention provides a braking force control system, comprising: vehicle speed detecting means for detecting a vehicle speed; steering wheel angle detecting means for detecting a steering angle; actual yaw rate detecting means for detecting an actual vehicle yaw rate; lateral acceleration detecting means for detecting a lateral vehicle acceleration; vehicle body slip angle calculating means for causing a computer to calculate a vehicle body slip angle on the basis of the detected vehicle speed, the detected actual vehicle yaw rate, and the detected lateral vehicle acceleration; steering wheel angle correcting means for causing a computer to correct the detected steering wheel angle on the basis of the calculated vehicle body slip angle; target yaw moment calculating means for causing a computer to calculate a target yaw moment on the basis of the detected actual vehicle yaw rate, the detected vehicle speed, and the steering wheel angle corrected by said steering wheel angle correcting means; braked wheel selecting means for causing a computer to select a wheel to be braked on the basis of the detected actual vehicle yaw rate and the target yaw moment calculated by said target yaw moment calculating means; target braking force calculating means for causing a computer to calculate a target braking force to be applied to the wheel selected by said braked wheel selecting means on the basis of the target yaw moment calculated by said target yaw moment calculating means; and braking signal outputting means for causing a computer to output a signal to a brake drive section, for application of the target braking force calculated by said target braking force calculating means to the wheel selected by said braked wheel selecting means.

Here, it is preferable that when the vehicle body slip angle calculated on the basis of the detected vehicle speed, the detected actual vehicle yaw rate, and the detected lateral vehicle acceleration lies within a predetermined set value, said steering wheel angle correcting means outputs the value detected by said steering wheel angle detecting means as it is to said target yaw moment calculating means as a corrected value.

Further, the third aspect of the present invention provides a braking force control system, comprising: vehicle speed detecting means for detecting a vehicle speed; steering wheel angle detecting means for detecting a steering angle; actual yaw rate detecting means for detecting an actual vehicle yaw rate; lateral acceleration detecting means for detecting a lateral vehicle acceleration; vehicle body slip angular velocity calculating means for causing a computer to calculate a vehicle body slip angular velocity on the basis of the detected vehicle speed, the detected actual vehicle yaw rate, and the detected lateral vehicle acceleration; actual yaw rate correcting means for causing a computer to correct the detected actual vehicle yaw rate on the basis of the calculated vehicle body slip angular velocity; target yaw moment calculating means for causing a computer to calculate a target yaw moment on the basis of the detected vehicle speed, the detected steering angle, and the actual vehicle yaw rate corrected by said actual yaw rate correcting means; braked wheel selecting means for causing a computer to select a wheel to be braked on the basis of the detected actual vehicle yaw rate and the target yaw moment calculated by said target yaw moment calculating means; target braking force calculating means for causing a computer to calculate a target braking force to be applied to the wheel selected by said braked wheel selecting means on the basis of the target yaw moment calculated by said target yaw moment calculating means; and braking signal outputting means for causing a computer to output a signal to a brake drive section, for application of the target braking force calculated by said target braking force calculating means to the wheel selected by said braked wheel selecting means.

Here, it is preferable that when the vehicle body slip angular velocity calculated on the basis of the detected vehicle speed, the detected actual vehicle yaw rate, and the detected lateral vehicle acceleration lies within a predetermined set value, said actual yaw rate correcting means outputs the value detected by said actual yaw rate detecting means as it is to said target yaw moment calculating means as a corrected value.

Further, the fourth aspect of the present invention provides a braking force control system, comprising: vehicle speed detecting means for detecting a vehicle speed; steering wheel angle detecting means for detecting a steering angle; actual yaw rate detecting means for detecting an actual vehicle yaw rate; lateral acceleration detecting means for detecting a lateral vehicle acceleration; vehicle body slip angle calculating means for causing a computer to calculate a vehicle body slip angle on the basis of the detected vehicle speed, the detected actual vehicle yaw rate, and the detected lateral vehicle acceleration; actual yaw rate correcting means for causing a computer to correct the detected actual vehicle yaw rate on the basis of the calculated vehicle body slip angle; target yaw moment calculating means for causing a computer to calculate a target yaw moment on the basis of the detected vehicle speed, the detected steering angle, and the actual vehicle yaw rate corrected by said actual yaw rate correcting means; braked wheel selecting means for causing a computer to select a wheel to be braked on the basis of the detected actual vehicle yaw rate and the target yaw moment calculated by said target yaw moment calculating means; target braking force calculating means for causing a computer to calculate a target braking force to be applied to the wheel selected by said braked wheel selecting means on the basis of the target yaw moment calculated by said target yaw moment calculating means; and braking signal outputting means for causing a computer to output a signal to a brake drive section, for application of the target braking force calculated by said target braking force calculating means to the wheel selected by said braked wheel selecting means.

Here, it is preferable that when the vehicle body slip angle calculated on the basis of the detected vehicle speed, the detected actual vehicle yaw rate, and the detected lateral vehicle acceleration lies within a predetermined set value, said actual yaw rate correcting means outputs the value detected by said actual yaw rate detecting means as it is to said target yaw moment calculating means as a corrected value.

Further, in above-mentioned first to fourth aspects of the present invention, it is preferable that said braked wheel selecting means decides a vehicle cornering direction on the basis of the detected actual vehicle yaw rate; and when the target yaw moment is the same as the vehicle cornering direction, a rear inside wheel is selected as the wheel to be braked; on the other hand, when the target yaw moment is opposite to the vehicle cornering direction, a front outside wheel is selected as the wheel to be braked.

In the first aspect of the braking force control system according to the present invention, said vehicle speed detecting means detects a vehicle speed; said steering wheel angle detecting means detects a steering angle; said actual yaw rate detecting means detects an actual vehicle yaw rate; and said lateral acceleration detecting means detects a lateral vehicle acceleration. Further, said vehicle slip angular velocity calculating means causes a computer to calculate a vehicle slip angular velocity on the basis of the detected vehicle speed, the detected actual vehicle yaw rate, and the detected lateral vehicle acceleration; said steering wheel angle correcting means causes a computer to correct the detected steering wheel angle on the basis of the calculated vehicle slip angular velocity; said target yaw moment calculating means causes a computer to calculate a target yaw moment on the basis of the detected actual vehicle yaw rate, the detected vehicle speed, and the steering wheel angle corrected by said steering wheel angle correcting means; said braked wheel selecting means causes a computer to select a wheel to be braked on the basis of the detected actual vehicle yaw rate and the target yaw moment calculated by said target yaw moment calculating means; said target braking force calculating means causes a computer to calculate a target braking force to be applied to the wheel selected by said braked wheel selecting means on the basis of the target yaw moment calculated by said target yaw moment calculating means; and said braking signal outputting means causes a computer to output a signal to a brake drive section, for application of the target braking force calculated by said target braking force calculating means to the wheel selected by said braked wheel selecting means.

Here, when the vehicle slip angular velocity calculated on the basis of the detected vehicle speed, the detected actual vehicle yaw rate, and the detected lateral vehicle acceleration lies within a predetermined set value, said steering wheel angle correcting means outputs the value detected by said steering wheel angle detecting means as it is to said target yaw moment calculating means as a corrected value, without executing any correction processing.

Further, in the second aspect of the braking force control system according to the present invention, said vehicle speed detecting means detects a vehicle speed; said steering wheel angle detecting means detects a steering angle; said actual yaw rate detecting means detects an actual vehicle yaw rate; and said lateral acceleration detecting means detects a lateral vehicle acceleration. Further, said vehicle body slip angle calculating means causes a computer to calculate a vehicle body slip angle on the basis of the detected vehicle speed, the detected actual vehicle yaw rate, and the detected lateral vehicle acceleration; said steering wheel angle correcting means causes a computer to correct the detected steering wheel angle on the basis of the calculated vehicle body slip angle; said target yaw moment calculating means causes a computer to calculate a target yaw moment on the basis of the detected actual vehicle yaw rate, the detected vehicle speed, and the steering wheel angle corrected by said steering wheel angle correcting means; said braked wheel selecting means causes a computer to select a wheel to be braked on the basis of the detected actual vehicle yaw rate and the target yaw moment calculated by said target yaw moment calculating means; said target braking force calculating means causes a computer to calculate a target braking force to be applied to the wheel selected by said braked wheel selecting means on the basis of the target yaw moment calculated by said target yaw moment calculating means; and said braking signal outputting means causes a computer to output a signal to a brake drive section, for application of the target braking force calculated by said target braking force calculating means to the wheel selected by said braked wheel selecting means.

Here, when the vehicle body slip angle calculated on the basis of the detected vehicle speed, the detected actual vehicle yaw rate, and the detected lateral vehicle acceleration lies within a predetermined set value, said steering wheel angle correcting means outputs the value detected by said steering wheel angle detecting means as it is to said target yaw moment calculating means as a corrected value, without executing any correction processing.

Further, in the third aspect the braking force control system according to the present invention, said vehicle speed detecting means detects a vehicle speed; said steering wheel angle detecting means detects a steering angle; said actual yaw rate detecting means detects an actual vehicle yaw rate; and said lateral acceleration detecting means detects a lateral vehicle acceleration. Further, said vehicle slip angular velocity calculating means causes a computer to calculate a vehicle slip angular velocity on the basis of the detected vehicle speed, the detected actual vehicle yaw rate, and the detected lateral vehicle acceleration; said actual yaw rate correcting means causes a computer to correct the detected actual vehicle yaw rate on the basis of the calculated vehicle slip angular velocity; said target yaw moment calculating means causes a computer to calculate a target yaw moment on the basis of the detected vehicle speed, the detected steering angle, and the actual vehicle yaw rate corrected by said actual yaw rate correcting means; said braked wheel selecting means causes a computer to select a wheel to be braked on the basis of the detected actual vehicle yaw rate and the target yaw moment calculated by said target yaw moment calculating means; said target braking force calculating means causes a computer to calculate a target braking force to be applied to the wheel selected by said braked wheel selecting means on the basis of the target yaw moment calculated by said target yaw moment calculating means; and said braking signal outputting means causes a computer to output a signal to a brake drive section, for application of the target braking force calculated by said target braking force calculating means to the wheel selected by said braked wheel selecting means.

Here, when the vehicle slip angular velocity calculated on the basis of the detected vehicle speed, the detected actual vehicle yaw rate, and the detected lateral vehicle acceleration lies within a predetermined set value, said actual yaw rate correcting means outputs the value detected by said actual yaw rate detecting means as it is to said target yaw moment calculating means as a corrected value, without executing any correction processing.

Further, in the fourth aspect of the braking force control system according to the present invention, said vehicle speed detecting means detects a vehicle speed; said steering wheel angle detecting means detects a steering angle; said actual yaw rate detecting means detects an actual vehicle yaw rate; and said lateral acceleration detecting means detects a lateral vehicle acceleration. Further, said vehicle body slip angle calculating means causes a computer to calculate a vehicle body slip angle on the basis of the detected vehicle speed, the detected actual vehicle yaw rate, and the detected lateral vehicle acceleration; said actual yaw rate correcting means causes a computer to correct the detected actual vehicle yaw rate on the basis of the calculated vehicle body slip angle; said target yaw moment calculating means causes a computer to calculate a target yaw moment on the basis of the detected vehicle speed, the detected steering angle, and the actual vehicle yaw rate corrected by said actual yaw rate correcting means; said braked wheel selecting means causes a computer to select a wheel to be braked on the basis of the detected actual vehicle yaw rate and the target yaw moment calculated by said target yaw moment calculating means; said target braking force calculating means causes a computer to calculate a target braking force to be applied to the wheel selected by said braked wheel selecting means on the basis of the target yaw moment calculated by said target yaw moment calculating means; and said braking signal outputting means causes a computer to output a signal to a brake drive section, for application of the target braking force calculated by said target braking force calculating means to the wheel selected by said braked wheel selecting means.

Here, when the vehicle body slip angle calculated on the basis of the detected vehicle speed, the detected actual vehicle yaw rate, and the detected lateral vehicle acceleration lies within a predetermined set value, said actual yaw rate correcting means outputs the value detected by said actual yaw rate detecting means as it is to said target yaw moment calculating means as a corrected value, without executing any correction processing.

Further, in above-mentioned first to fourth aspects of the present invention, said braked wheel selecting means decides a vehicle cornering direction on the basis of the detected actual vehicle yaw rate; and when the target yaw moment is the same as the vehicle cornering direction, a rear inside wheel is selected as the wheel to be braked; on the other hand, when the target yaw moment is opposite to the vehicle cornering direction, a front outside wheel is selected as the wheel to be braked.

BRIEF DESCRIPTION OF THE DRAWINGS

FIG. 1 is a functional block diagram showing a first embodiment of the braking force control system according to the present invention;

FIG. 5 is a flowchart of a braked wheel selecting routine executed by the first embodiment of the braking force control system according to the present invention;

FIG. 10 is a functional block diagram showing a fourth embodiment of the braking force control system according to the present invention.

DETAILED DESCRIPTION OF THE PREFERRED EMBODIMENTS

Preferred embodiments of the present invention will be described in detail hereinbelow with reference to the attached drawings.

1st Embodiment

Figure 2:
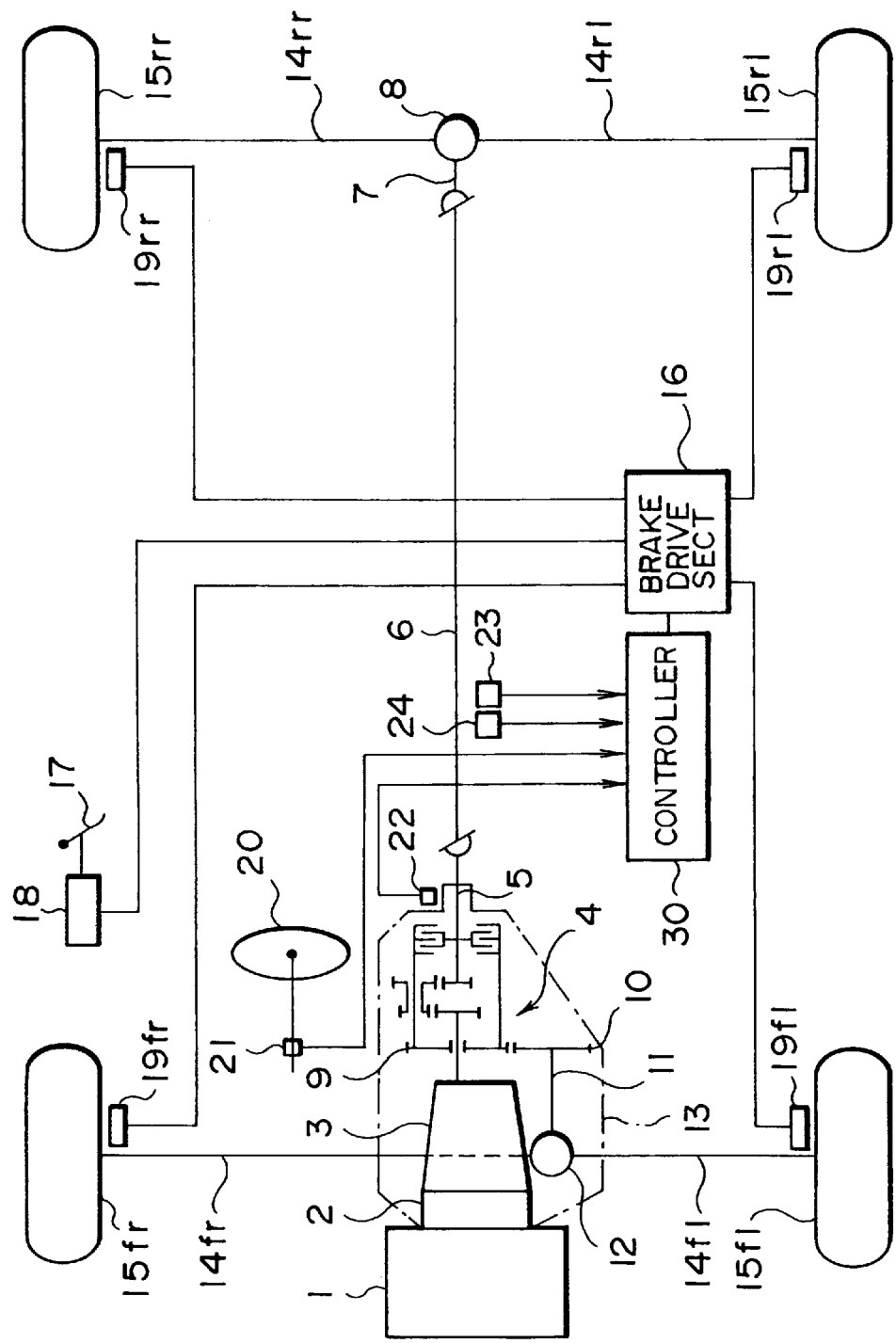
FIG. 2 is a diagrammatical block diagram showing the first embodiment of the braking force control system according to the present invention.
Figure 3:
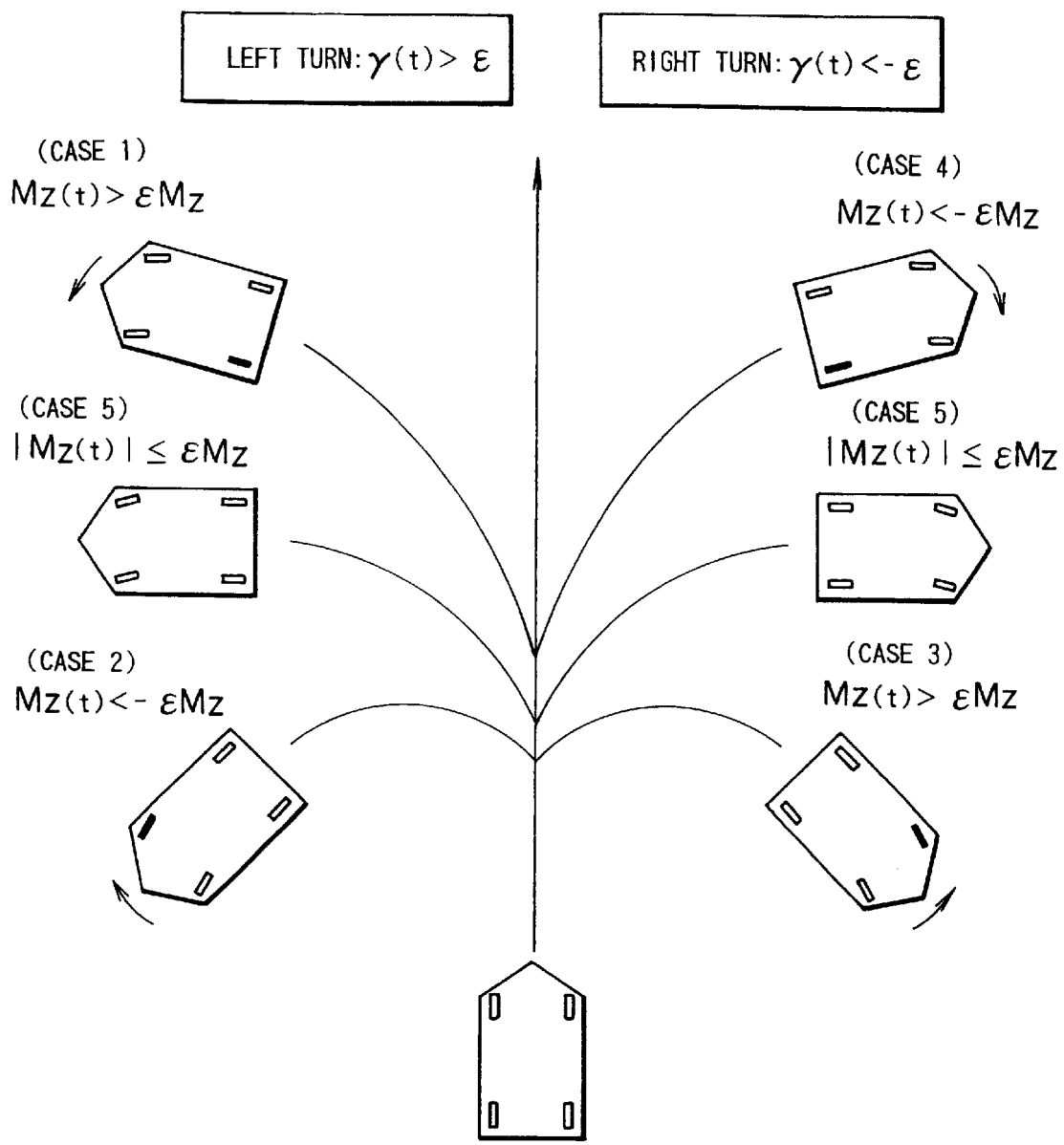
FIG. 3 is an illustration for assistance in explaining the vehicle braking operation caused under the braking force control executed by the first embodiment of the braking force control system according to the present invention.
Figure 4:
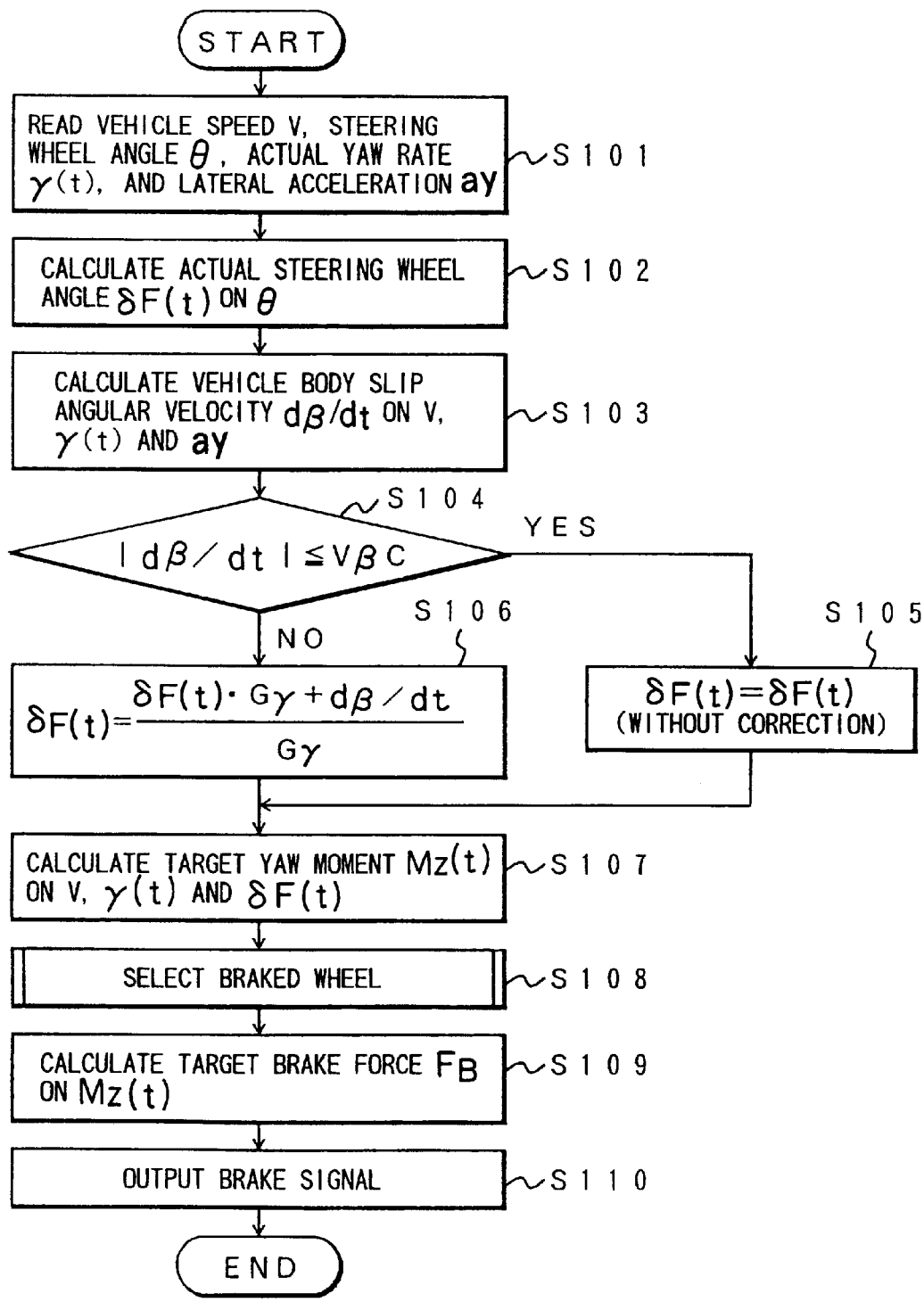
FIG. 4 is a flowchart for controlling the braking force by the first embodiment of the braking force control system according to the present invention.

A first embodiment thereof will be explained with reference to FIGS. 1 to 5. FIG. 1 is a functional block diagram showing the first embodiment of the braking force control system; FIG. 2 is a diagrammatical illustration showing the same braking force control system; FIG. 3 is an illustration for assistance in explaining the vehicle braking operation by the same braking force control system; FIG. 4 is a flowchart showing the operation of the same braking force control system; and FIG. 5 is a flowchart of a routine for selecting the braked wheel.

In FIG. 2, an engine 1 is mounted on the front side of an automotive vehicle. A driving force generated by the engine 1 is transmitted from a clutch mechanism 2 to a center differential gear 4 through a transmission mechanism 3. Further, the driving force is transmitted from the center differential gear 4 to a rear wheel final reduction gear 8 via a rear drive shaft 5, a propeller shaft 6 and a drive pinion shaft 7. On the other hand, the driving force is transmitted to a front wheel final reduction gear 12 via a transfer gear drive 9, a transfer driven gear 10, and a front drive shaft (i.e., a drive pinion shaft) 11. Here, the above-mentioned clutch mechanism 2, the transmission mechanism 3, the center differential gear 4, the front wheel final reduction gear 12, etc. are all arranged within a casing 13 together.

The driving force inputted to the rear wheel final reduction gear 8 is transmitted to a rear left wheel 15rl via a rear wheel left drive shaft 14rl and to a rear right wheel 15rr via a rear wheel right drive shaft 14rr. On the other hand, the driving force inputted to the front wheel final reduction gear 12 is transmitted to a front left wheel 15fl via a front wheel left drive shaft 14fl and to a front right wheel 15fr via a front wheel right drive shaft 14fr.

Further, in FIG. 2, a master cylinder 18 connected to a brake pedal 17 depressed by a driver is coupled to a brake drive section 16. Therefore, when the driver depresses the brake pedal 17, braking pressure is introduced from the master cylinder 18 to each of four wheel cylinders (i.e., a front left wheel cylinder 19fl, a front right wheel cylinder 19fr, a rear left wheel cylinder 19rl, and a rear right wheel cylinder 19rr) mounted on each of the four wheels (the front left wheel 15fl, the front right wheel 15fr, the rear left wheel 15rl, and the rear right wheel 1rr) through the brake drive section 16, with the result that the four wheels can be braked, respectively.

The above-mentioned brake drive section 16 is a hydraulic unit provided with a pressure source, pressure reducing valves, pressure intensifying valves, etc. Further, the brake drive section 16 can introduce brake pressure into each of the wheel cylinders 19fl, 19fr, 19rl and 19rr, independently in response to an input signal applied thereto.

Further, a steering wheel angle sensor 21 for detecting a steering wheel angle θ is mounted on a steering column of a steering wheel 20. A vehicle speed sensor (vehicle speed detecting means) 22 for detecting the number of revolutions of a rear wheel output shaft is mounted on the casing 13. Further, a lateral acceleration sensor (lateral acceleration detecting means) 23 for detecting the acceleration in the vehicle lateral direction (lateral acceleration $a_y$) and a yaw rate sensor (actual yaw rate detecting means) 24 for detecting an actual vehicle yaw rate γ(t) are both mounted on a vehicle body.

Further, in FIG. 2, a controller 30 is composed of a microcomputer and its peripheral units, to which the steering wheel angle sensor 21, the vehicle speed sensor 22, the lateral acceleration sensor 23 and the yaw rate sensor 24 are all connected to generate a drive signal to the brake drive section 16.

As shown in FIG. 1, a controller 30 is mainly composed of a front wheel steering wheel angle calculating section 31, a vehicle body slip angular velocity calculating section 32, a front wheel steering wheel angle correcting section 33, a target yaw moment calculating section 34, a target braking force calculating section 35, a braked wheel selecting section 36, and a brake signal outputting section 37.

In response to a signal applied from the steering wheel angle sensor 21, the front wheel steering wheel angle calculating section 31 calculates an actual front wheel steering wheel angle(actual steering wheel angle δF(t)) on the basis of the steering wheel angle θ under consideration of the steering gear ratio N, and outputs the calculated actual steering wheel angle to the front wheel steering wheel angle correcting section 33. Here, the steering wheel angle sensor 21 and the front wheel steering wheel angle calculating section 31 constitute steering wheel angle detecting means.

In response to signals applied from the vehicle speed sensor 22, the lateral acceleration sensor 23 and the yaw rate sensor 24, the vehicle body slip angular velocity calculating section 32 calculates a vehicle body slip angular velocity dβ/dt in accordance with the following formula (1). The vehicle body slip angular velocity calculating section 32 is vehicle body slip angular velocity calculating means.

$$dβ/dt = a_y/V - γ(t) \qquad (1)$$

On the basis of the vehicle body slip angular velocity dβ/dt calculated by the vehicle body slip angular velocity calculating section 32, the front wheel steering wheel angle correcting section 33 corrects the actual steering wheel angle δF(t)calculated by the front wheel steering wheel angle calculating section 31 in accordance with the following formula (2). The corrected actual steering wheel angle δF(t)is outputted to target yaw moment calculating section 34. Here, the front wheel steering wheel angle correcting section 33 is steering wheel angle correcting means.

$$δF(t) = (δF(t) \cdot Gγ + dβ/dt)/Gγ \qquad (2)$$

where $G\gamma$ denotes a steady-state gain at the target yaw rate (described later).

Further, the correction in accordance with the formula (2) is executed only when an absolute value $|d\beta/dt|$ of the vehicle body slip angular velocity $d\beta/dt$ is larger than a predetermined set value VBC (a positive number) previously obtained on the basis of experiments and calculations. Therefore, when this absolute value is smaller than the set value VBC, the actual steering wheel angle $\delta F(t)$ obtained by the front wheel steering wheel angle calculating section 31 is outputted as it is to the target yaw moment calculating section 34, so that it is possible to eliminate an unnecessary correcting control when the vehicle is being driven stably on a usual non-slippery road.

When the above-mentioned correction is executed in accordance with the formula (2), even if the vehicle tends to be spun when the yaw rate $\gamma(t)$ has a positive sign (i.e., when the vehicle is turning to the left) on a slippery road with a low friction ($\mu$), since the vehicle body slip angular velocity $d\beta/dt$ becomes a negative value, the actual steering wheel angle $\delta F(t)$ is corrected to a smaller value. Therefore, even if the driver unavoidably turns the steering wheel excessively on a slippery road, for instance, since an excessive actual steering wheel angle $\delta F(t)$ can be corrected to an optimum actual steering wheel angle $\delta F(t)$, it is possible to obtain a stable control by use of the corrected actual steering wheel angle $\delta F(t)$.

The target yaw moment calculating section 34 (the target yaw moment calculating means) 34 calculates a target yaw moment $Mz(t)$ on the basis of the vehicle speed V obtained by the vehicle speed sensor 22, the actual yaw rate $\gamma(t)$ obtained by the yaw rate sensor 24, and the corrected actual steering wheel angle $\delta F(t)$ obtained by the front wheel steering wheel angle correcting section 33.

Here, the method of calculating the target yaw moment $Mz(t)$ will be described in detail hereinbelow. When the vehicle is linearized by replacing it with a two-wheel model, the equation of motion thereof can be expressed as follows:

$$Iz \cdot d\gamma(t)/dt = 2 \cdot LF \cdot CF(t) - 2 \cdot LR \cdot CR(t) + Mz(t) \tag{3}$$

$$M \cdot V(d\beta(t)/dt + \gamma(t)) = 2 \cdot CF(t) + 2 \cdot CR(t) \tag{4}$$

where $CF(t)$ is the front wheel cornering force and $CR(t)$ is the rear wheel cornering force both expressed as follows:

$$CF(t) = kF \cdot (\delta F(t)/N - \beta(t) - LF \cdot \gamma(t)/V) \tag{5}$$

$$CR(t) = kR \cdot (-\beta(t) + LR \cdot \gamma(t)/V) \tag{6}$$

where M denotes the vehicle mass, Iz denotes the vehicle yaw inertia; $\gamma(t)$ denotes the yaw rate; $Mz(t)$ denotes the yaw moment (target yaw moment) caused by the braking force; $\beta(t)$ denotes the vehicle body slip angle, LF denotes the distance between the front wheel and the vehicle gravity center; LR denotes the distance between the rear wheel and the vehicle gravity center; kF denotes the equivalent front wheel cornering power; kR denotes the equivalent rear wheel cornering power, and N denotes the steering gear ratio.

Here, the above formulae (3) and (4) can be expressed by an input/output system by setting the output of the vehicle motion as $\gamma(t)$ as follows:

$$A(p \cdot \gamma(t)) = BM(p) \cdot Mz(t) + BF(p) \cdot \delta F(t) \tag{7}$$

where $$A(p) = p^2 - (a11 + a22) \cdot (2/V) \cdot p +$$
$$(a11 \cdot a22 - a12 \cdot a21) \cdot (2/V)^2 + 2 \cdot a12$$
$$= p^2 - ay1 \cdot (2/V) \cdot p + ay2 \cdot (2/V)^2 + 2 \cdot ay3$$

$$BM(p) = p/Iz + 2 \cdot (kF + kR)/(M \cdot Iz \cdot V)$$
$$= (p - a22 \cdot (2/V))/Iz$$

$$BF(p) = b11 \cdot (2/N) \cdot p + (a12 \cdot b21 - a22 \cdot b11) \cdot (4/N \cdot V)$$
$$= by1 \cdot (2/N) \cdot p + by2 \cdot (4/N \cdot V)$$

where
a11=−(LF²·kF+LR²·kR)/Iz
a12=−(LF·kF=LR·kR)/Iz
a21=−(LF·kF−LR·kR)/M
a22=−(kF+kR)/M
ay1=a11+a22
ay2=a11·a22−a12·a21
ay3=a12
b11=LF·kF/Iz
b21=kF/M
by1=b11
by2=a12·b21−a22·b11
p=d/dt (i.e., differential operator)

Further, the following formula is established as an normative model of the vehicle motion.

$$dxm(t)/dt = -am \cdot Xm(t) + bm \cdot \delta F(t) \tag{8}$$

$$ym(t) = Xm(t) \tag{9}$$

Here, am and bare both constants. Therefore, when the target yaw rate $ym(t)$ is determined in accordance with the formulae (8) and (9), the steady-state gain $G\gamma$ of the target yaw rate for the actual steering wheel angle $\delta F(t)$ can be expresses as $$G\gamma = bm/am \tag{10}$$

Successively, such a yaw moment $Mz(t)$ that the output $\gamma(t)$ can asymptotically follow the output $ym(t)$ of the normative model is taken into account, by use of the detectable signals $\gamma(t)$, $\delta F(t)$, and $V(t)$.

Here, the following two stable polynomials $Q(p)$ and $D(p)$ are introduced:

$$Q(p) = Q1(p) \cdot D(p) \tag{11}$$

$$Q1(p) = p + q1$$

$$D(p) = p + d1$$

where $q1 > 0$ and $d1 > 0$

Therefore, when $A(p)$ and $BM(p)$ of the formula (7) are both expressed by using $Q(p)$ and $D(p)$, the following formulae can be obtained:

$$A(p) = Q(p) - A1(p) \tag{12}$$

$$BM(p) = b1 \cdot D(p) + b0 \tag{13}$$

where $$A1(p) = (q1 + d1 + ay1 \cdot (2/V)) \cdot p + q1 \cdot d1 - ay2 \cdot (2/V)^2 - 2 \cdot ay3$$

$$b1 = I/Iz$$

$$b0 = (-a22 \cdot (2/V) - d1)/Iz$$

Here, when the formulae (12) and (13) are substituted for the formula (7), $$(Q(p)-A1(p))\cdot \gamma(t)=(b1\cdot D(p)+b0)\cdot Mz(t)+BF(p)\cdot \delta F(t)$$

Therefore, $$Qp\cdot \gamma(t)=A1(p)\cdot \gamma(t)+(b1\cdot D(p)+b0)\cdot Mz(t)+BF(p)\cdot \delta F(t) \quad (14)$$

Further, on the basis of the formulae (8) and (9), since $$(p+q1)\cdot ym(t)-q1\cdot ym(t)=-am\cdot ym(t)+bm\cdot \delta F(t) \; Q1(p)\cdot ym(t)=(q1-am)\cdot ym(t)+bm\cdot \delta F(t) \quad (15)$$

Here, since $Q(P)=BF(p)\cdot D(p)$ in the formula (11), the formula (14) can be expressed as $$Q1(p)\cdot D(p)\cdot \gamma(t)=A1(p)\cdot \gamma(t)+(b1\cdot D(p)+b0)\cdot Mz(t)+BF(p)\cdot D^{-1}(p)\cdot \delta F(t)$$

so that the following formula can be obtained $$Q1(p)\cdot \gamma(t)=A1(p)\cdot D^{-1}(p)\cdot \gamma(t)+(b1+b0\cdot D^{-1}(p)\cdot Mz(t)+BF(p)\cdot D^{-1}(P)\cdot \delta F(t) \quad (16)$$

Here, when the output error e(t) is defined as $$e(t)=ym(t)-\gamma(t) \quad (17)$$

the following error equation can be obtained on the basis of the formulae (15) and (16):

$$Q1(p)\cdot e(t)=(q1-am)\cdot ym(t)+bm\cdot \delta F(t)-A1(p)\cdot D^{-1}(p)\cdot \gamma(t)-(b1+b0\cdot D^{-1}(p))\cdot Mz(t)-BF(p)\cdot D^{-1}(p)\cdot \delta F(t) \quad (18)$$

Here, when Mz(t) is so selected that the right side of the formula (18) can be zeroed, $$Mz(t)=1/b1\cdot (-A1(p)\cdot D^{-1}(p)\cdot \gamma(t)-b0\cdot D^{-1}(p)\cdot Mz(t)-BF(p)\cdot D^{-1}(p)\cdot \delta F(t)+(q1-am)\cdot ym(t)+bm\cdot \delta F(t) \quad (19)$$

Further, when Q1 is substituted for the formula (11), $$Q1(p)\cdot e(t)=(p+q1)\cdot e(t)=0$$

Therefore, since $$de(t)/dt=-q1\cdot e(t) \quad (20)$$

when q1>0, e(t) can be zeroed, so that it is possible to obtain the output γ(t) corresponding to the normative model.

The target yaw moment Mz(t) calculated by the target yaw moment calculating section 34 is inputted to the target braking force calculating section 35 and the braked wheel selecting section 36, respectively.

The target braking force calculating section (the target braking force calculating means) 35 calculates the target braking force FB on the basis of the target yaw moment Mz(t) as follows:

$$FB=Mz(t)/(d/2) \quad (21)$$

where d denotes a vehicle tread.

Further, the braked wheel selecting section (the braked wheel selecting means) 36 decides the vehicle cornering direction on the basis of the actual yaw rate γ(t) obtained by the yaw rate sensor 24. When the target yaw moment Mz(t) calculated by the target yaw moment calculating section 34 is the same as the vehicle cornering direction, the braked wheel selecting section 36 selects the rear inside wheel as the wheel to be braked. On the other hand, when the target yaw moment Mz(t) calculated by the target yaw moment calculating section 34 is opposite to the vehicle cornering direction, the braked wheel selecting section 36 selects the front outside wheel as the wheel to be braked. Therefore, the following combinations can be determined, where the signs of the actual yaw rate γ(t) and the target yaw moment Mz(t) are positive (+) when the vehicle is turning to the left but negative (−) when turning to the right.

Further, in order to decide that the vehicle is driven in straight, ε is set to a positive number near zero previously obtained on the basis of experiments or calculations. Further, in order to decide that the target yaw moment Mz(t) is roughly zero in turning state, εMz is set to another positive number near zero previously obtained on the basis of experiments or calculations.

(Case 1) When γ(t)>ε and Mz(t)>εMz; that is, when the vehicle is turning to the left in under-steering tendency, the rear left wheel is braked.

(Case 2) When γ(t)>ε and Mz(t)<−εMz; that is, when the vehicle is turning to the left in over-steering tendency, the front right wheel is braked.

(Case 3) When γ(t)<ε and Mz(t)>εMz; that is, when the vehicle is turning to the right in over-steering tendency, the front left wheel is braked.

(Case 4) When γ(t)<ε and Mz(t)<−εMz; that is, when the vehicle is turning to the right in under-steering tendency, the rear right wheel is braked.

(Case 5) When $|\gamma(t)|\leq \epsilon$ in straight drive or when $|Mz(t)|\leq \epsilon Mz$ in turning drive, any braked wheel is not selected.

The above-mentioned braking control is summarized in FIG. 3.

The braked wheel selected by the braked wheel selecting section 36 is outputted to the target braking force calculating section 35. Further, the selected braked wheel is outputted to the braking signal outputting section 37 together with the target braking force FB calculated by the target braking force calculating section 35.

The braking signal outputting section (the braking signal outputting means) 37 outputs a braking signal to the braking drive section 16 so that the target braking force FB calculated by the target braking force calculating section 35 is applied to the braked wheel selected by the braked wheel selecting section 36.

The braking force control of the first embodiment will be explained in further detail with reference to flowcharts shown in FIGS. 4 and 5. The braking force control program is executed for each predetermined time (e.g., 10 ms) when the vehicle is running.

Upon start of the program, in step S101, a vehicle speed V is read from the vehicle speed sensor 22, a steering wheel angle θ is read from the steering wheel angle sensor 21, an actual yaw rate γ(t) is read from the yaw rate sensor 24, and a lateral acceleration ay is read from the lateral acceleration sensor 23. Further, in step S102, an actual steering wheel angle δF(t) is calculated on the basis of the steering wheel angle θ by the front wheel steering wheel angle calculating section 31 under consideration of a steering gear ratio N.

Further, in step S103, a vehicle body slip angular velocity dβ/dt is calculated by the vehicle body slip angular velocity calculating section 32 on the basis of the vehicle sped V, the actual yaw rate γ(t) and the lateral acceleration ay in accordance with the formula (1).

Here, the steps from S104 to S106 are processing executed by the front wheel steering wheel angle correcting section 33. In more detail, in step S104, the absolute value |dβ/dt| of the vehicle body slip angular velocity dβ/dt is compared with the set value VBC (a positive number) previously obtained by experiments or calculations. When the absolute value |dβ/d| of the vehicle body slip angular velocity dβ/dt is smaller than the set value VBC (i.e., $|d\beta/dt| \leq VBC$), in step S105 $\delta F(t)=\delta F(t)$ is set. That is, the value $\delta F(t)$ obtained by the front wheel steering wheel angle calculating section 31 is outputted from the front wheel steering wheel angle correcting section 33 as it is without any correction. In other words, when the absolute value $|d\beta/dt|$ of the vehicle body slip angular velocity $d\beta/dt$ is small and therefore when the vehicle is running normally on a non-slippery road, it is possible to eliminate an unnecessary control.

On the other hand, in step S104, when the absolute value $|d\beta/dt|$ of the vehicle body slip angular velocity $d\beta/dt$ is larger than the set value VBC (i.e., $|d\beta/dt|>VBC$), in step S106 the actual steering wheel angle $\delta F(t)$ is corrected in accordance with the formula (2). Therefore, even if the driver unavoidably turns the steering wheel excessively on a slippery road, an excessive actual steering wheel angle $\delta F(t)$ can be corrected to an optimum actual steering wheel angle $\delta F(t)$.

After the actual steering wheel angle $\delta F(t)$ is set or corrected in step S105 or S106, in step S107 a target yaw moment Mz(t) is calculated by the target yaw moment calculating section 34 on the basis of the vehicle speed V, the actual yaw rate $\gamma(t)$, and the corrected actual steering wheel angle $\delta F(t)$ in accordance with the formula (19).

After that, in step S108, a braked wheel is selected by the braked wheel selecting section 36 in accordance with a braked wheel selecting routine (described later) as shown in FIG. 5. Further, in step S109, a target braking force FB is calculated by the target braking force calculating section 35 on the basis of the target yaw moment Mz(t) and in accordance with the formula (21). Further, in step S110, a signal is outputted to the brake drive section 16 so that the target braking force FB calculated by the target braking force calculating section 35 can be applied to the wheel selected by the braked wheel selecting section 36, ending the program.

Here, the braked wheel selecting routine executed by the braked wheel selecting section 36 will be explained hereinbelow with reference to FIG. 5.

First, in step S201, the actual yaw rate $\gamma(t)$ is compared with the value $\epsilon$ to discriminate whether the vehicle is turning to the left excessively to some extent. When the actual yaw rate $\gamma(t)$ is less than $\epsilon$, in step S202 the actual yaw rate $\gamma(t)$ is compared with the value $-\epsilon$ to discriminate whether the vehicle is turning to the right excessively to some extent.

When the vehicle is decided to be not turning to the right excessively in step S202; that is, if the actual yaw rate $\gamma(t)$ lies between $\epsilon$ and $-\epsilon$ ($\epsilon \geq \gamma(t) \geq -\epsilon$), since the vehicle motion is roughly in straight state, in step S211 any braked wheel is not selected (without braking the vehicle).

Further, in step S201 when the vehicle is decided to be turning to the left excessively to some extent; that is, if the actual yaw rate $\gamma(t)>\epsilon$, in step S203 it is discriminated whether the target yaw moment Mz(t) is roughly zero; that is, $|Mz(t)| \leq \epsilon Mz$.

Further, in step S203, when $|Mz(t)| \leq \epsilon Mz$; that is, when the target yaw moment Mz(t) is decided to be roughly zero, the routine proceeds to step S211. However, in the other case (i.e., in the case of under-steering or over-steering tendency), the routine proceeds to step S204.

In step S204, it is decided whether the steering tendency is under-steering (Mz(t)>$\epsilon$Mz) or over-steering (Mz(t)<$-\epsilon$Mz) on the basis of the positive or negative (direction) of the target yaw moment Mz(t). In the case where Mz(t)>$\epsilon$Mz and further the sign of the target yaw moment Mz(t) is positive (the left direction) in the same way as that of the actual yaw rate $\gamma(t)$, the under-steering tendency is decided. Therefore, in step S205, the rear left wheel 15rl is selected as the wheel to be braked by the target braking force FB calculated in step S109, ending the routine. On the other hand, in the case where Mz(t)<$-\epsilon$Mz and further the sign of the target yaw moment Mz(t) is negative (the right direction) being different from that of the actual yaw rate $\gamma(t)$, the over-steering tendency is decided. Therefore, in step S206, the rear right wheel 15fr is selected as the wheel to be braked by the target braking force FB calculated in step S109, ending the routine.

On the other hand, in step S202 when the vehicle is decided to be turning to the right excessively to some extent; that is, if the actual yaw rate $\gamma(t)<-\epsilon$, in step S207 it is discriminated whether the target yaw moment Mz(t) is roughly zero; that is, $|Mz(t)| \leq \epsilon Mz$.

Further, in step S207, when $|Mz(t)| \leq \epsilon Mz$ in; that is, when the target yaw moment Mz(t) is decided to be roughly zero, the routine proceeds to step S211. However, in the other cases (under-steering or over-steering tendency), the routine proceeds to step S208.

In step S208, it is decided whether the steering tendency is under-steering (Mz(t)<$-\epsilon$Mz) or over-steering (Mz(t)>$\epsilon$Mz) on the basis of the positive or negative (direction) of the target yaw moment Mz(t). In the case where Mz(t)<$-\epsilon$Mz and further the sign of the target yaw moment Mz(t) is negative (the right direction) in the same way as that of the actual yaw rate $\gamma(t)$, the under-steering tendency is decided. Therefore, in step S209, the rear right wheel 15rr is selected as the wheel to be braked by the target braking force FB calculated in step S109, ending the routine. On the other hand, in the case where Mz(t)>$\epsilon$Mz and further the sign of the target yaw moment Mz(t) is positive (the left direction) being different from that of the actual yaw rate $\gamma(t)$, the over-steering tendency is decided. Therefore, in step S210, the front left wheel 15fl is selected as the wheel to be braked by the target braking force FB calculated in step S109, ending the routine.

Further, when the routine proceeds from the steps S202, S203 or the steps S207 to the step S211, the braked wheel is not selected (without vehicle braking), ending the routine.

As described above, in the first embodiment of the present invention, since the braking force can be controlled by correcting the actual steering wheel angleon the basis of the vehicle body'slip angular velocity and further by calculating the target yaw moment on the basis of the corrected actual steering angle, the vehicle speed, and the actual yaw rate, even if the driver unavoidably turns the steering wheel excessively on a slippery road, for instance, the wheel braking force can be controlled under optimum conditions on the basis of the corrected actual steering angle, with the result that a stable vehicle turning travel can be attained without setting the target braking force to an excessively large target braking force.

Further, since the actual steering wheel angleis not corrected when the vehicle body slip angular velocity lies within a predetermined set value, it is possible to eliminate the braking force control when the vehicle is running normally on a non-slippery road and thereby the correction is not required.

Further, since the braked wheel can be selected immediately on the basis of the actual yaw rate and the direction of the target yaw moment, it is possible to execute the braking force control accurately and effectively at high response speed.

2nd Embodiment

A second embodiment of the present invention will be described hereinbelow with reference to FIGS. 6 and 7.

Figure 6:
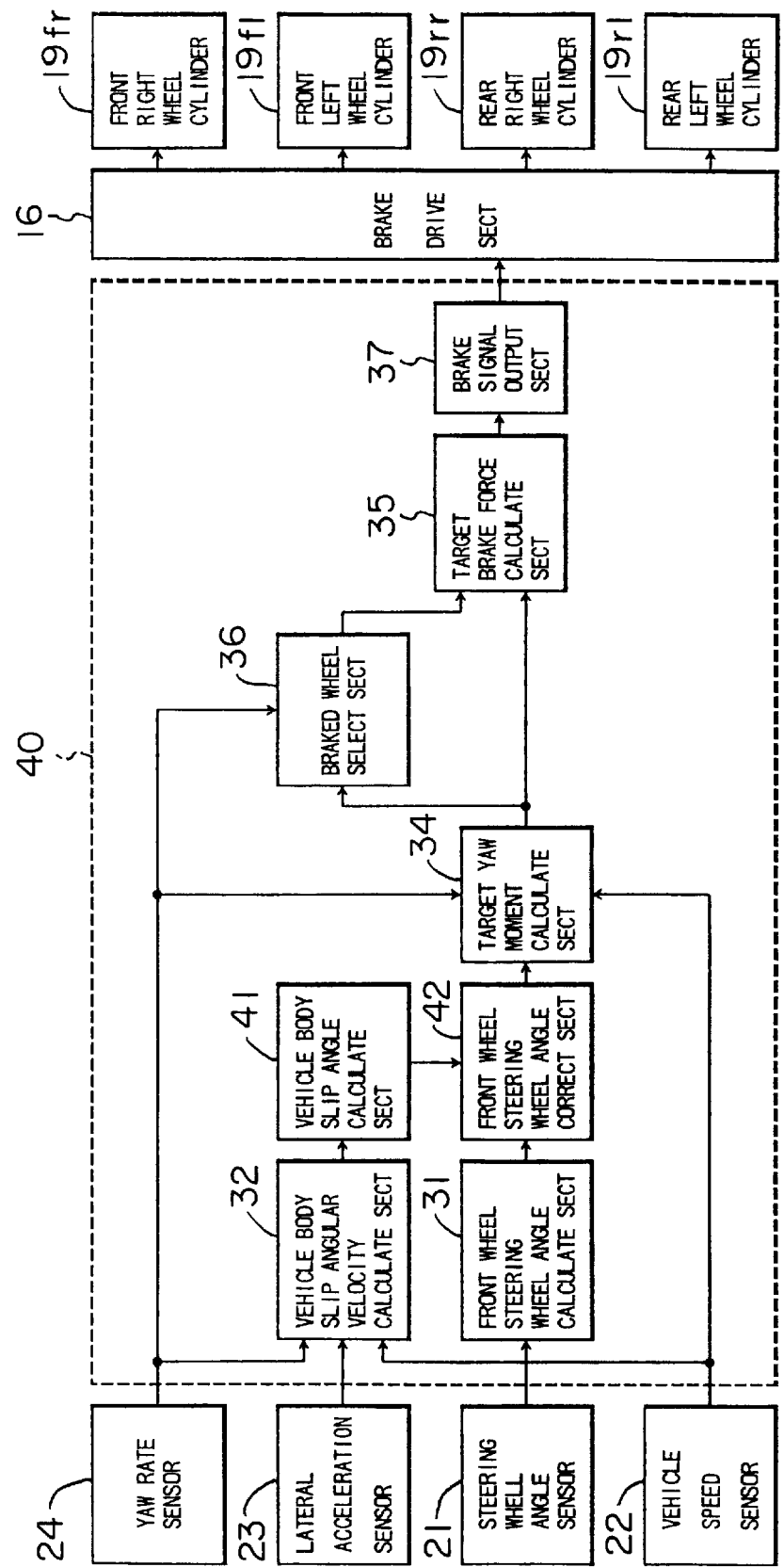
FIG. 6 is a functional block diagram showing a second embodiment of the braking force control system according to the present invention.
Figure 7:
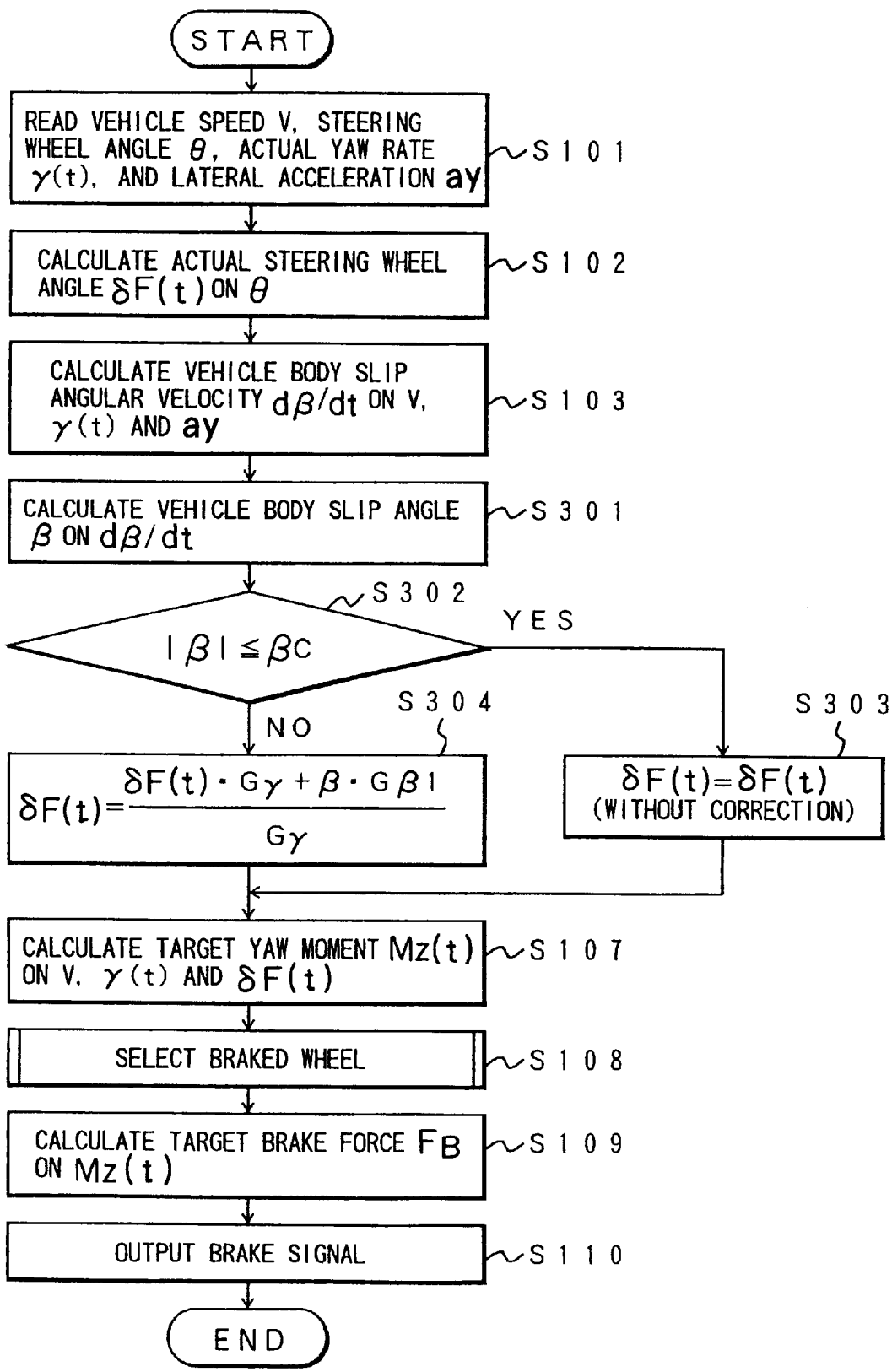
FIG. 7 is a flowchart for controlling the braking force by the second embodiment of the braking force control system according to the present invention.

FIG. 6 is a functional block diagram showing the second embodiment of the braking force control system; and FIG. 7 is a flowchart showing the operation of the same braking force control system. The feature of this second embodiment is that the vehicle body slip angle is first calculated; the actual steering wheel angle is corrected on the basis of the calculated vehicle body slip angle; and the target yaw moment is calculated on the basis of the corrected actual steering angle. Further, in FIGS. 6 and 7, the same reference numerals have been retained for the similar parts or elements having the same functions as with the case of the first embodiment.

As shown in FIG. 6, a controller 40 is mainly composed of a front wheel steering wheel angle calculating section 31, a vehicle body slip angular velocity calculating section 32, a vehicle body slip angle calculating section 41, a front wheel steering wheel angle correcting section 42, a target yaw moment calculating section 34, a target braking force calculating section 35, a braked wheel selecting section 36, and a brake signal outputting section 37.

On the basis of a vehicle body slip angular velocity dσ/dt calculated by the vehicle body slip angular velocity calculating section 32, the vehicle body slip angle calculating section 41 calculates a vehicle body slip angle β by integrating the inputted vehicle body slip angular velocity dβ/dt, and outputs the obtained vehicle body slip angle β to the front wheel steering wheel angle correcting section 42. Here, the vehicle body slip angle β can be expressed as follows:

$$\beta_k = \beta_{k-1} + d\beta/dt \cdot \Delta t \qquad (22)$$

where $\beta_k$ denotes the newly set vehicle body slip angle; $\beta_{k-1}$ denotes the vehicle body slip angle calculated at the last time; and Δt denotes the calculation cycle of the arithmetic unit (microcomputer).

In other words, in the case of the first embodiment, the vehicle body slip angular velocity calculating section 32 is the vehicle body slip angular velocity calculating means. In the case of the second embodiment, however, the vehicle body slip angular velocity calculating section 32 and the vehicle body slip angle calculating section 41 constitute the vehicle body slip angle calculating means.

On the basis of the vehicle body slip angle β inputted by the vehicle body slip angle calculating section 41, the front wheel steering wheel angle correcting section (steering wheel angle correcting means) 42 corrects an actual steering wheel angle δF(t) inputted by the front wheel steering wheel angle calculating section 31 in accordance with the following formula and outputs the corrected actual steering wheel angle δF(t) to the target yaw moment calculating section 34.

$$\delta F(t) = (\delta F(t) \cdot G\gamma + \beta \cdot G\beta 1)/G\gamma \qquad (23)$$

where Gβ1 denotes a constant for deciding the correction degree of the vehicle body slip angle.

Further, the correction in accordance with the formula (23) is executed only when an absolute value |β| of the vehicle body slip angle β is larger than a predetermined set value BC (a positive number) previously obtained on the basis of experiments and calculations. Therefore, when this value is smaller than the set value BC, the actual steering wheel angle δF(t) obtained by the front wheel steering wheel angle calculating section 31 is outputted as it is to the target yaw moment calculating section 34, so that it is possible to eliminate an unnecessary correcting control when the vehicle is being driven stably on a usual non-slippery road.

When the above-mentioned correction is made in accordance with the formula (23), even if the vehicle tends to be spun when the yaw rate γ(t) has a positive sign (i.e., when the vehicle is turning to the left) on a road with a low friction (μ), since the vehicle body slip angle β becomes a negative value, the actual steering wheel angle δF(t) can be corrected to a smaller value. Therefore, even if the driver unavoidably rotates the steering wheel excessively on a slippery road, for instance, since an excessive actual steering wheel angle δF(t) can be corrected to an optimum actual steering wheel angle δF(t), it is possible to obtain a stable control by use of the corrected actual steering wheel angle δF(t).

The braking force control of the second embodiment will be explained in further detail with reference to a flowchart shown in FIG. 7, which corresponds to the flowchart shown in FIG. 4.

In step S103, after a vehicle body slip angular velocity dβ/dt has been calculated by the vehicle body slip angular velocity calculating section 32 on the basis of the vehicle sped V, the actual yaw rate γ(t) and the lateral acceleration ay, in step S301 the vehicle body slip angle β is calculated by the vehicle body slip angle calculating section 41 on the basis of the vehicle body slip angular velocity dβ/dt and in accordance with the formula (22).

Here, the steps S302 to S304 are the processing executed by the front wheel steering wheel angle correcting section 42. In more detail, first in step S302, the absolute value |β| of the vehicle body slip angle β is compared with the set value BC (a positive number) previously obtained by experiments or calculations. When the absolute value |β| of the vehicle body slip angle β is smaller than the set value BC (i.e., |dβ|≦BC), in step S303 δF(t)=δF(t) is set. That is, the value δF(t) obtained by the front wheel steering wheel angle calculating section 31 is outputted from the front wheel steering wheel angle correcting section 42 as it is without any correction. In other words, when the absolute value |β| of the vehicle body slip angle β is small and therefore when the vehicle is running normally on a non-slippery road, it is possible to eliminate an unnecessary control.

Further, in step S302, when the absolute value |β| of the vehicle body slip angle β is larger than the set value BC (i.e., |β|>BC), in step S304 the actual steering wheel angle δF(t) is corrected in accordance with the formula (23). Therefore, even if the driver unavoidably turns the steering wheel excessively on a slippery road, an excessive actual steering wheel angle δF(t) can be corrected to an optimum actual steering wheel angle δF(t).

After the actual steering wheel angle δF(t) is set or corrected in step S303 or S304, in step S107 a target yaw moment Mz(t) is calculated by the target yaw moment calculating section 34 on the basis of the vehicle speed V, the actual yaw rate γ(t), and the corrected actual steering wheel angle δF(t) in accordance with the formula (19).

Further, the other steps from S108 to S110 are the same as with the case of the first embodiment shown in FIG. 4.

As described above, in the second embodiment of the present invention, since the braking force can be controlled by correcting the actual steering wheel angle on the basis of the vehicle body slip angle and further by calculating the target yaw moment on the basis of the corrected actual steering angle, the vehicle speed, and the actual yaw rate, even if the driver unavoidably turns the steering wheel excessively on a slippery road, for instance, the wheel braking force can be controlled under optimum conditions on the basis of the corrected actual steering angle, with the result that a stable vehicle turning travel can be attained without setting the target braking force to an excessively large target braking force.

Further, since the actual steering wheel angle is not corrected when the vehicle body slip angle lies within a predetermined set value, it is possible to eliminate the braking force control when the vehicle is running normally on a non-slippery road and thereby the correction is not required.

Further, the first embodiment can be modified in such a way that the vehicle body slip angle is obtained on the basis of the vehicle body slip angular velocity and further the actual steering wheel angleis not corrected when the obtained vehicle body slip angle lies within a predetermined value. In contrast with this, the second embodiment can be modified in such a way that the actual steering wheel angleis not corrected when the obtained vehicle body slip angular velocity lies within a predetermined value.

3rd Embodiment

A third embodiment of the present invention will be described hereinbelow with reference to FIGS. 8 and 9.

Figure 8:
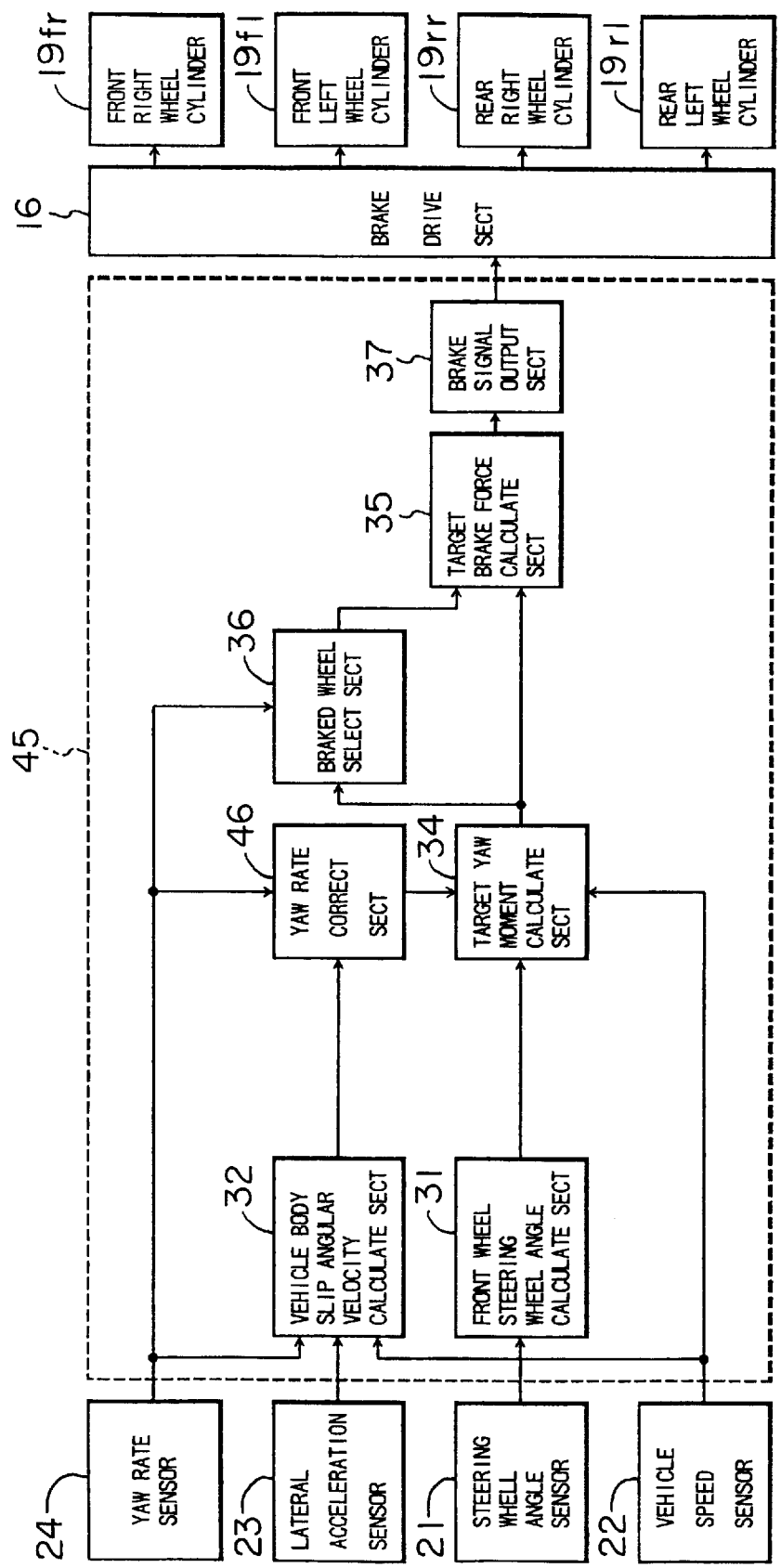
FIG. 8 is a functional block diagram showing a third embodiment of the braking force control system according to the present invention.
Figure 9:
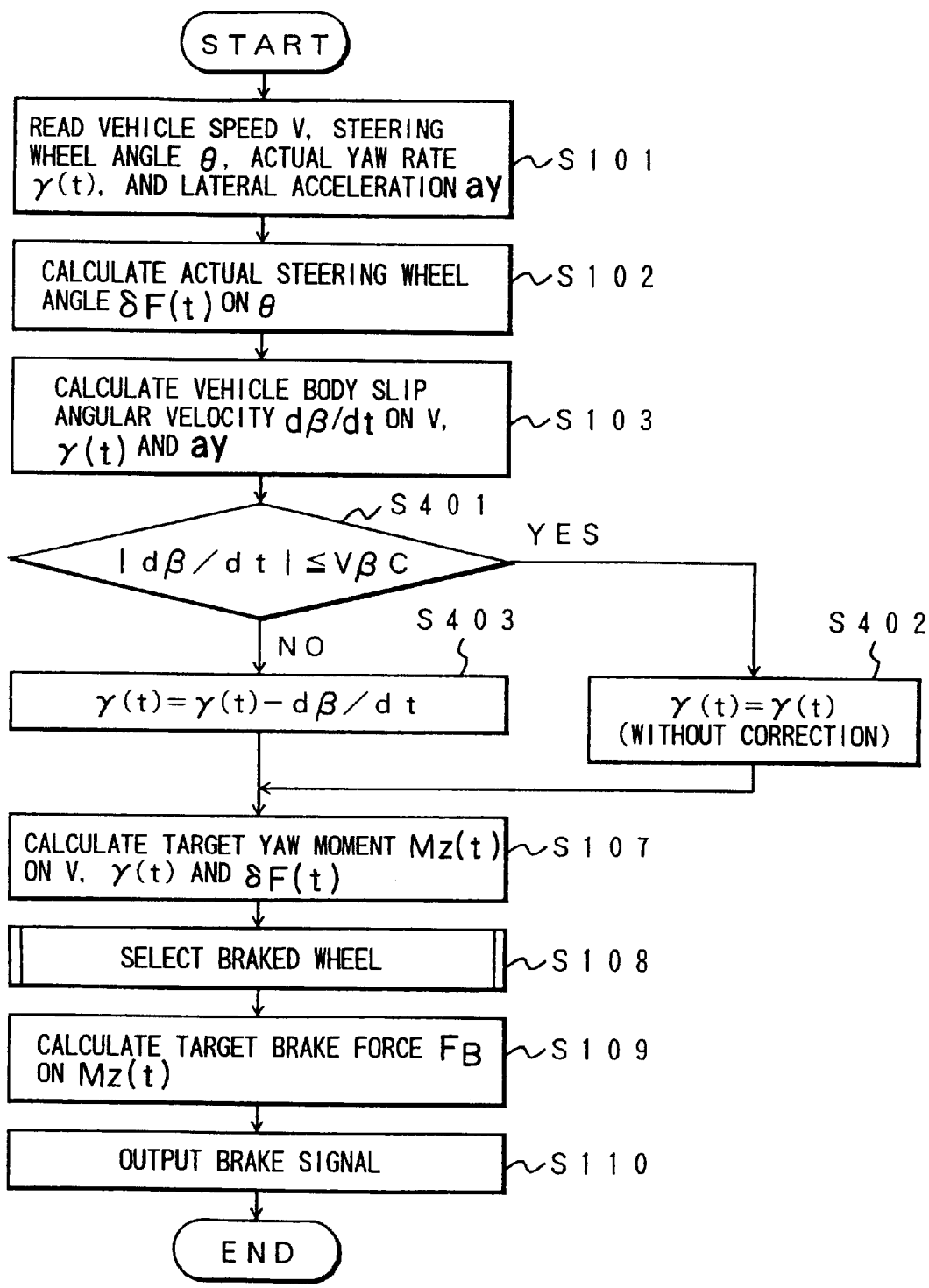
FIG. 9 is a flowchart for controlling the braking force by the third embodiment of the braking force control system according to the present invention.

FIG. 8 is a functional block diagram showing the third embodiment of the braking force control system; and FIG. 9 is a flowchart showing the operation of the same braking force control system. The feature of this third embodiment is that the vehicle body slip angular velocity is first calculated; the actual yaw rate is corrected on the basis of the calculated vehicle body slip angular velocity; and the target yaw moment is calculated on the basis of the corrected actual yaw rate. Further, in FIGS. 8 and 9, the same reference numerals have been retained for the similar parts or elements having the same functions as with the case of the first embodiment.

As shown in FIG. 8, a controller 45 is mainly composed of a front wheel steering wheel angle calculating section 31, a vehicle body slip angular velocity calculating section 32, a yaw rate correcting section 46, a target yaw moment calculating section 34, a target braking force calculating section 35, a braked wheel selecting section 36, and a brake signal outputting section 37.

On the basis of a signal applied by the yaw rate sensor 24 and a signal applied by the vehicle body slip angular velocity calculating section 32, the yaw rate correcting section (actual yaw rate correcting means) 46 corrects the actual yaw rate γ(t) on the basis of the vehicle body slip angular velocity dβ/dt and in accordance with the following formula (24), and outputs the corrected actual yaw rate γ(t) to the target yaw moment calculating section 34.

$$\gamma(t)=\gamma(t)-d\beta/dt \quad (24)$$

Further, the correction in accordance with the formula (24) is executed only when an absolute value |dβ/dt| of the vehicle body slip angular velocity dβ/dt is larger than a predetermined set value VBC (a positive number) previously obtained on the basis of experiments and calculations. Therefore, when this value is smaller than the predetermined set value VBC, the actual yaw rate γ(t) obtained by the yaw rate sensor 24 is outputted as it is to the target yaw moment calculating section 34, so that it is possible to eliminate an unnecessary correcting control when the vehicle is being driven stably on a usual non-slippery road.

When the above-mentioned correction is executed in accordance with the formula (24), even if the vehicle tends to be spun when the yaw rate γ(t) has a positive sign (i.e., when the vehicle is turning to the left) on a road with a low friction (μ), since the vehicle body slip angular velocity dβ/dt becomes a negative value, the actual yaw rate γ(t) is corrected to a larger value. Therefore, even if the driver unavoidably turns the steering wheel excessively on a slippery road, for instance, since the actual yaw rate γ(t) can be corrected to an optimum yaw rate γ(t), it is possible to obtain a stable control by use of the corrected actual yaw rate γ(t).

Further, on the basis of the vehicle speed V obtained by the vehicle speed sensor 22, the actual steering wheel angle δF(t) obtained by the front wheel steering wheel angle calculating section 31, and the actual yaw rate γ(t) obtained by the yaw rate correcting section 46, the target yaw moment calculating section 34 calculates the target yaw moment Mz(t). In other words, in this third embodiment, the actual steering wheel angle δF(t) obtained by the front wheel steering wheel angle calculating section 31 is inputted to the target yaw moment calculating section 34 without any correction.

The braking force control of the third embodiment will be explained in further detail with reference to a flowchart shown in FIG. 9, which corresponds to the flowchart shown in FIG. 4.

In step S103, after a vehicle body slip angular velocity dβ/dt has been calculated by the vehicle body slip angular velocity calculating section 32 on the basis of the vehicle sped V, the actual yaw rate γ(t) and the lateral acceleration ay, the program proceeds to step S401.

Here, the steps S401 to S403 are the processing executed by the yaw rate correcting section 46. In more detail, first in step S401, the absolute value |dβ/dt| of the vehicle body slip angular velocity dβ/dt is compared with the predetermined set value VBC (a positive number) previously obtained by experiments or calculations. When the absolute value |dβ/dt| of the vehicle body slip angular velocity dβ/dt is smaller than the set value VBC (i.e., |dβ/dt|≦VBC), in step S402 γ(t)=γ(t) is set. That is, the value γ(t) obtained by the yaw rate sensor 24 is outputted from the yaw rate correcting section 46 to the target yaw moment calculating section 34 as it is without any correction. In other words, when the absolute value |dβ/dt| of the vehicle body slip angular velocity dβ/dt is small and therefore when the vehicle is running normally on a non-slippery road, it is possible to eliminate an unnecessary control.

Further, in step S401, when the absolute value |dβ/dt| of the vehicle body slip angular velocity dβ/dt is larger than the predetermined set value VBC (i.e., |dβ/dt|>VBC), in step S403 the actual yaw rate γ(t) is corrected in accordance with the formula (24). Therefore, even if the driver unavoidably turns the steering wheel excessively on a slippery road, an actual yaw rate can be corrected to an optimum actual yaw rate γ(t).

After the actual yaw rate γ(t) is set or corrected in step S402 or S403, in step S107 a target yaw moment Mz(t) is calculated by the target yaw moment calculating section 34 on the basis of the vehicle speed V, the actual steering wheel angle δF(t), and the corrected actual yaw rate γ(t) in accordance with the formula (19).

Further, the other steps from S108 to S110 are the same as with the case of the first embodiment shown in FIG. 4.

As described above, in the third embodiment of the present invention, since the braking force can be controlled by correcting the actual yaw rate on the basis of the vehicle body slip angular velocity and further by calculating the target yaw moment on the basis of the corrected actual yaw rate, the vehicle speed, and the actual steering angle, even if the driver unavoidably turns the steering wheel excessively on a slippery road, for instance, the wheel braking force can be controlled under optimum conditions on the basis of the corrected yaw rate, with the result that a stable vehicle turning travel can be attained without setting the target braking force to an excessively large target braking force.

Further, since the actual yaw rate is not corrected when the vehicle body slip angular velocity lies within a predetermined set value, it is possible to eliminate the braking force control when the vehicle is running normally on a non-slippery road and thereby the correction is not required.

4th Embodiment

A fourth embodiment of the present invention will be described hereinbelow with reference to FIGS. 10 and 11.

Figure 11:
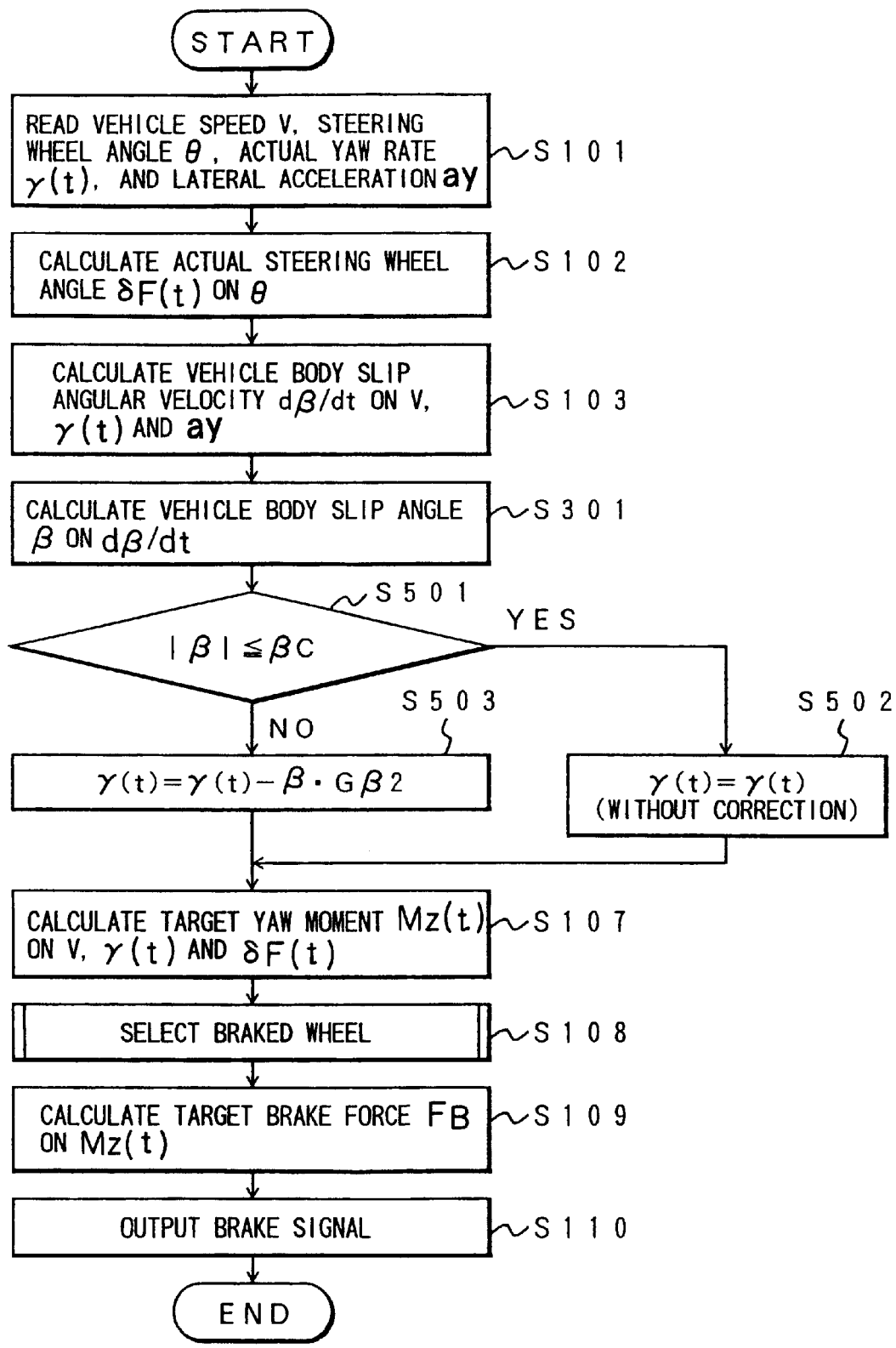
FIG. 11 is a flowchart for controlling the braking force by the fourth embodiment of the braking force control system according to the present invention.

FIG. 10 is a functional block diagram showing the fourth embodiment of the braking force control system; and FIG. 11 is a flowchart showing the operation of the same braking force control system. The feature of this fourth embodiment is that the vehicle body slip angle is first calculated; the actual yaw rate is corrected on the basis of the calculated vehicle body slip angle; and the target yaw moment is calculated on the basis of the corrected actual yaw rate. Further, in FIGS. 10 and 11, the same reference numerals have been retained for the similar parts or elements having the same functions as with the case of the first embodiment.

As shown in FIG. 10, a controller 50 is mainly composed of a front wheel steering wheel angle calculating section 31, a vehicle body slip angular velocity calculating section 32, a vehicle body slip angle calculating section 41, a yaw rate correcting section 51, a target yaw moment calculating section 34, a target braking force calculating section 35, a braked wheel selecting section 36, and a brake signal outputting section 37.

On the basis of a vehicle body slip angle β inputted by the vehicle body slip angle calculating section 41, the yaw rate correcting section (actual yaw rate correcting means) 51 corrects the actual yaw rate γ(t) obtained by the yaw rate sensor 24 in accordance with the following formula (25), and outputs the corrected actual yaw rate γ(t) to the target yaw moment calculating section 34.

$$\gamma(t) = \gamma(t) - \beta \cdot Gf2 \qquad (25)$$

where Gf2 denotes a constant for deciding the correction degree on the basis of the vehicle body slip angle.

Further, the correction in accordance with the formula (25) is executed only when an absolute value |β| of the vehicle body slip angle g is larger than a predetermined set value BC (a positive number) previously obtained on the basis of experiments and calculations. Therefore, when this value is smaller than the set value BC, the actual yaw rate γ(t) obtained by the yaw rate sensor 24 is outputted as it is from the yaw rate correcting section 51 to the target yaw moment calculating section 34, so that it is possible to eliminate an unnecessary correcting control when the vehicle is being driven stably on a usual non-slippery road.

When the above-mentioned correction is made in accordance with the formula (25), even if the vehicle tends to be spun when the yaw rate γ(t) has a positive sign (i.e., when the vehicle is turning to the left) on a road with a low friction (μ), since the vehicle body slip angle β becomes a negative value, the actual yaw rate γ(t) is corrected to a larger value. Therefore, even if the driver unavoidably turns the steering wheel excessively on a slippery road, for instance, since the actual yaw rate γ(t) can be corrected to an optimum yaw rate γ(t), it is possible to obtain a stable control by use of the corrected actual yaw rate γ(t).

Further, on the basis of the vehicle speed V obtained by the vehicle speed sensor 22, the actual steering wheel angle δF(t) obtained by the front wheel steering wheel angle calculating section 31, and the actual yaw rate γ(t) obtained by the yaw rate correcting section 51, the target yaw moment calculating section 34 calculates the target yaw moment Mz(t). In other words, in this fourth embodiment, the actual steering wheel angle δF(t) obtained by the front wheel steering wheel angle calculating section 31 is inputted to the target yaw moment calculating section 34 without any correction.

The braking force control of the fourth embodiment will be explained in further detail with reference to a flowchart shown in FIG. 11, which corresponds to the flowchart shown in FIG. 7.

In step S301, after a vehicle body slip angle β has been calculated by the vehicle body slip angle calculating section 41, the program proceeds to step S501.

Here. the steps from S501 to S503 are the processing executed by the yaw rate correcting section 51. In more detail, first in step S501, the absolute value |β| of the vehicle body slip angle β is compared with the predetermined set value BC (a positive number) previously obtained by experiments or calculations. When the absolute value |dβ/dt| of the vehicle body slip angle β is smaller than the set value BC (i.e., |β|≦BC), in step S502 γ(t)=γ(t) is set. That is, the value γ(t) obtained by the yaw rate sensor 24 is outputted from the yaw rate correcting section 51 to the target yaw moment calculating section 34 as it is without any correction. In other words, when the absolute value |β| of the vehicle body slip angle β is small and therefore when the vehicle is running normally on a non-slippery road, it is possible to eliminate an unnecessary control.

Further, in step S501, when the absolute value of the vehicle body slip angle β is larger than the predetermined set value VBC (i.e., |β|>VBC), in step S503, the actual yaw rate γ(t) is corrected in accordance with the formula (25). Therefore, even if the driver unavoidably turns the steering wheel excessively on a slippery road, an actual yaw rate can be corrected to an optimum actual yaw rate γ(t).

After the actual yaw rate γ(t) is set or corrected in step S502 or S503, in step S107 a target yaw moment Mz(t) is calculated by the target yaw moment calculating section 34 on the basis of the vehicle speed V, the actual steering wheel angle δF(t), and the corrected actual yaw rate γ(t) in accordance with the formula (19).

Further, the other steps from S108 to S110 are the same as with the case of the first embodiment shown in FIG. 4.

As described above, in the fourth embodiment of the present invention, since the braking force can be controlled by correcting the actual yaw rate on the basis of the vehicle body slip angle and further by calculating the target yaw moment on the basis of the corrected actual yaw rate, the vehicle speed, and the actual steering angle, even if the driver unavoidably turns the steering wheel excessively on a slippery road, for instance, the wheel braking force can be controlled under optimum conditions on the basis of the corrected yaw rate, with the result that a stable vehicle turning travel can be attained without setting the target braking force to an excessively large target braking force.

Further, since the actual yaw rate is not corrected when the vehicle body slip angle lies within a predetermined set value, it is possible to eliminate the braking force control when the vehicle is running normally on a non-slippery road and thereby the correction is not required.

Further, the third embodiment can be modified in such a way that the vehicle body slip angle is obtained on the basis of the vehicle body slip angular velocity and further the actual steering wheel angleis not corrected when the obtained vehicle body slip angle lies within a predetermined value. In contrast with this, the fourth embodiment can be modified in such a way that the actual steering wheel angleis not corrected when the obtained vehicle body slip angular velocity lies within a predetermined value.

As described above, in the braking force control system according to the present invention, since the parameters used to calculate the target yaw moment are previously corrected appropriately and further since the braking force is controlled on the basis of the target yaw moment calculated by use of the corrected parameters, even if the driver unavoidably turns the steering wheel excessively on a slippery road, for instance, the target braking force is not set to a large value beyond necessity, with the result that a stable vehicle turning travel can be attained.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A braking force control system for automotive vehicle, comprising:

a vehicle speed detector;

a steering wheel detector;

an actual yaw rate detector;

a lateral acceleration detector;

a vehicle body slip angle calculator which calculates vehicle body slip angle based on detected vehicle speed, detected actual vehicle yaw rate, and detected lateral vehicle acceleration;

a steering wheel angle corrector which corrector for correcting a detected steering wheel angle based on calculated vehicle body slip angle;

a target yaw moment calculator which calculates a target yaw moment based on a detected actual vehicle yaw rate, detected vehicle speed, and steering wheel angle corrected by said steering wheel angle corrector means;

a braked wheel selector for selecting a wheel to be braked based on the detected actual vehicle yaw rate and the target yaw moment calculated by said target yaw moment calculator;

a target braking force calculator calculating a target braking force to be applied to the wheel selected by said braked wheel selector based on the target yaw moment calculated by said target yaw moment calculator; and a braking signal outputter for outputting a signal to a brake drive section, for application of the target braking force calculated by said target braking force calculating means to the wheel selected by said braked wheel selector.

2. The braking force control system according to claim 1, wherein when the vehicle body slip angle calculated based on the detected vehicle speed, the detected actual vehicle yaw rate, and the detected lateral vehicle acceleration is smaller than a predetermined value, said steering angle corrector outputs the value detected by said steering wheel angle detector to said target yaw moment calculator as a corrected value.

3. The braking force control system according to claim 1 wherein said braked wheel selector decides a vehicle cornering direction on the basis of the detected actual vehicle yaw rate; and when a direction of the target yaw moment is the same as the vehicle cornering direction, a rear inside wheel is selected as the wheel to be braked; and when the direction of the target yaw moment is opposite to the vehicle cornering direction, a front outside wheel is selected as the wheel to be braked.

4. The braking force control system according to claim 1, further comprising:

vehicle body slip angle calculator interposed between said angular velocity calculator and said steering angle corrector and responsive to said angular velocity signal and for calculating a body slip angle ($\beta$) by integrating thereof and for producing said angular velocity signal so as to easily derive a more exact correction value.

5. A braking force control method for a vehicle having a vehicle speed detector for detecting a speed (V) of said vehicle from an R.P.M. of a rear wheel driveshaft, a steering angle detector provided near a steering wheel on said vehicle for calculating an actual front wheel steering angle ($\delta F(t)$) from a steering angle ($\theta$) of said steering wheel, a lateral acceleration sensor mounted on said vehicle for detecting an acceleration amount (ay) in a lateral direction of said vehicle, and a yaw rate sensor for detecting an actual yaw rate ($\gamma(t)$) of said vehicle when negotiating a corner, comprising the steps of:

calculating an angular velocity ($d\beta/dt$) of a vehicle body slip by using a predetermined slip equation in relation to said speed (V), said actual yaw rate ($\gamma(t)$) and said acceleration amount (ay);

deriving a correction amount ($\delta F(t)$) of said steering angle by using a predetermined correction equation with said angular velocity ($d\beta/dt$);

computing a target yaw moment (Mz(t)) by using said previously derived speed (V) and actual yaw rate ($\gamma(t)$) and previously calculated correction amount ($\delta F(t)$);

choosing a wheel in order to apply a brake force in accordance with a moving condition of said vehicle;

deciding a target brake force (FB) dependent on said target yaw moment and said moving condition; and applying an optimum braking force to each wheel so as to control said vehicle at a stable condition even when said vehicle is running on a slippery road;

calculating a body slip angle ($\beta$) by integrating said vehicle body slip angle in relation to said angular velocity ($d\beta/dt$); and correcting said body slip angle ($\beta$) so as to easily derive a more exact correction value.

* * * * *